United States Patent [19]
Takei et al.

[11] Patent Number: 5,523,860
[45] Date of Patent: Jun. 4, 1996

[54] IMAGE TRANSMISSION APPARATUS INDICATING A COLOR TYPE OF THE COLOR SIGNAL TRANSMITTED

[75] Inventors: Masahiro Takei, Yokohama; Tomishige Taguchi, Urawa; Norio Kimura, Tokyo; Tsuguhide Sakata, Machida; unio Tsuruno, Tokyo; Yasutomo Suzuki, Yokohama, all of Japan

[73] Assignee: Canon Kabushiki Kaisha, Tokyo, Japan

[21] Appl. No.: 107,364

[22] Filed: Aug. 17, 1993

Related U.S. Application Data

[62] Division of Ser. No. 888,442, May 28, 1992, which is a continuation of Ser. No. 772,129, Oct. 9, 1991, abandoned, which is a continuation of Ser. No. 393,660, Aug. 14, 1989, abandoned, which is a division of Ser. No. 52,740, May 20, 1987, Pat. No. 4,910,604.

[30] Foreign Application Priority Data

| May 21, 1986 | [JP] | Japan | 61-116974 |
| May 21, 1986 | [JP] | Japan | 61-116975 |
| May 21, 1986 | [JP] | Japan | 61-116976 |
| May 21, 1986 | [JP] | Japan | 61-116977 |
| May 21, 1986 | [JP] | Japan | 61-116978 |
| May 21, 1986 | [JP] | Japan | 61-116979 |

[51] Int. Cl.$^6$ .................................................. H04N 5/76
[52] U.S. Cl. ............................... 358/444; 358/907
[58] Field of Search .......................... 358/296–301, 358/444, 903, 907, 909

[56] References Cited

U.S. PATENT DOCUMENTS

| 3,854,130 | 12/1974 | Ligocki | 340/324 R |
| 3,864,729 | 2/1975 | Camras | 358/4 |
| 3,975,759 | 8/1976 | Taniguchi et al. | 358/4 |
| 4,075,700 | 2/1978 | Blay | 364/515 |
| 4,077,047 | 2/1978 | Yamagiwa | 358/4 |
| 4,097,892 | 6/1978 | Balding | 358/80 |
| 4,524,421 | 6/1985 | Searby et al. | 364/521 |
| 4,592,035 | 5/1986 | Miyasho | 358/907 |
| 4,613,852 | 9/1986 | Maruko | 340/703 |
| 4,649,482 | 3/1987 | Raviv et al. | 364/417 |
| 4,701,897 | 10/1987 | Nakagawa | 358/907 |
| 4,707,733 | 11/1987 | Shinyagaito et al. | 358/907 |
| 4,739,397 | 4/1988 | Hayashi | 358/80 |
| 4,772,962 | 9/1988 | Tanaka et al. | 360/10.1 |
| 4,843,574 | 6/1989 | Gerber | 364/526 |
| 4,870,406 | 9/1989 | Gupta et al. | 340/70 |
| 5,089,811 | 2/1992 | Leach | 340/703 |

OTHER PUBLICATIONS

Masami Itoga, et al., "A Triple Imaging System", Mitsubishi Denki Giho: vol. 54, No. 2, pp. 42–45, Feb. 1980.

Masami Itoga, et al., "Triple System Color TV, Video Cassette Recorder and Projection TV", Mitsubishi Electric Advance, pp. 25 and 26, Mar. 1980.

*Primary Examiner*—Stephen Brinich
*Attorney, Agent, or Firm*—Fitzpatrick, Cella, Harper & Scinto

[57] ABSTRACT

An image transmission apparatus includes circuitry for separating color image information into a plurality of color signals and transmitting the plurality of color signals. An indication device is provided for, in response to the transmission of the plurality of color signals from the transmitting circuitry, indicating which of the plurality of color signals is transmitted. The indication may include an indication of one of a R G or B signal or an indication of a monochromatic or multi-chromatic transmission.

16 Claims, 33 Drawing Sheets

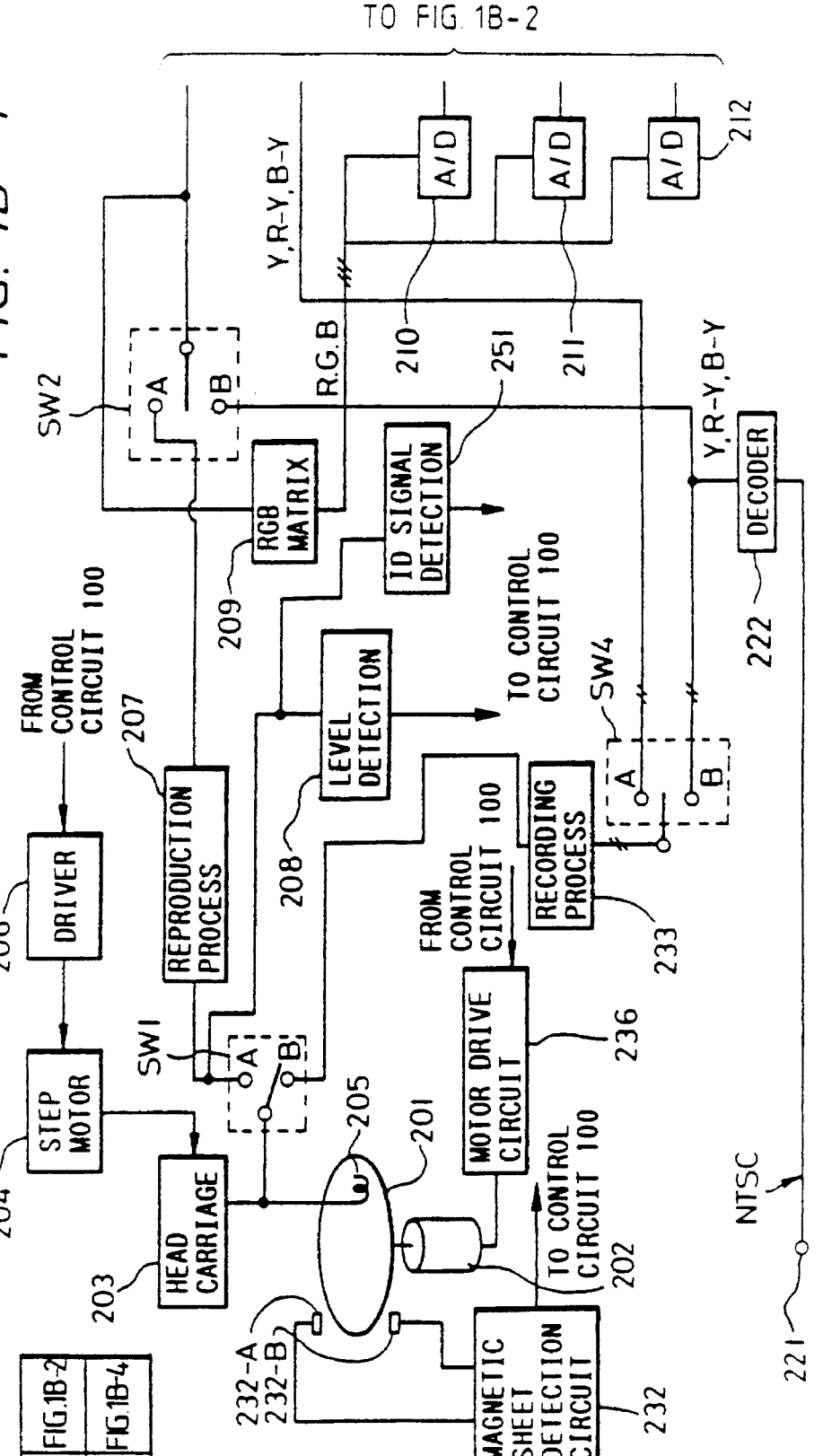

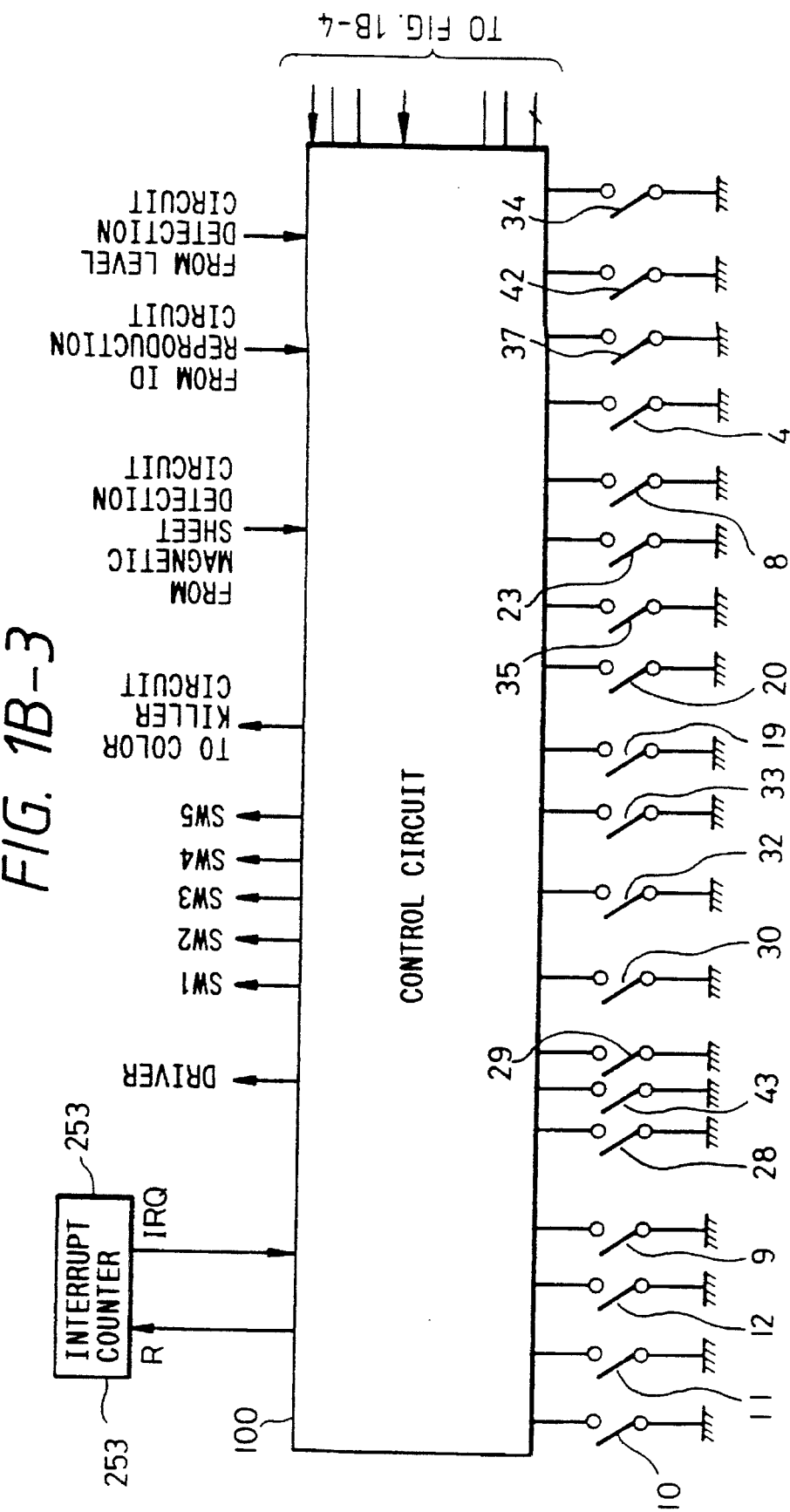

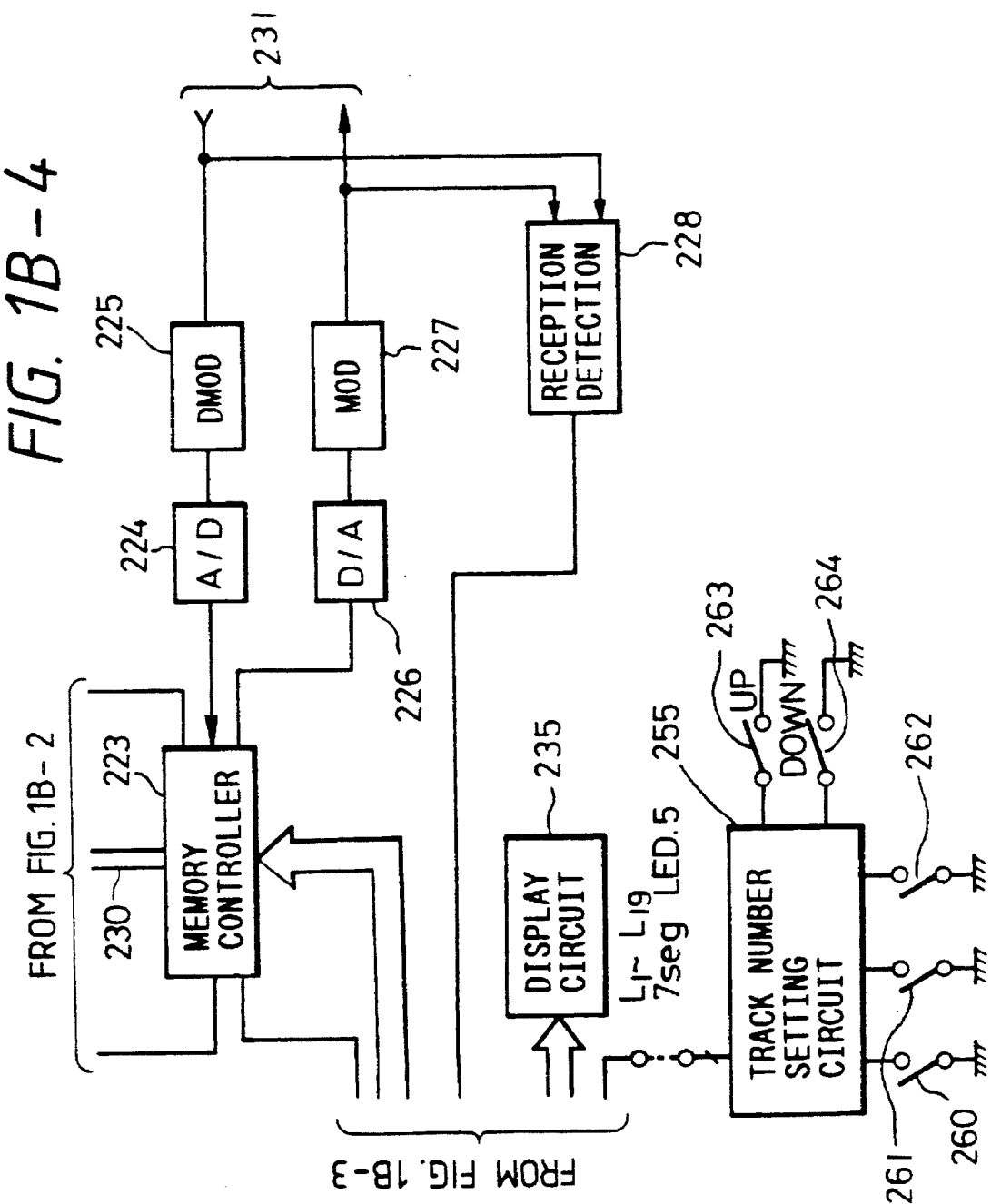

| FIG.5A-1 |
| FIG.5A-2 |
| FIG.5A-3 |

| FIG. 5B-1 |
| FIG. 5B-2 |
| FIG. 5B-3 |

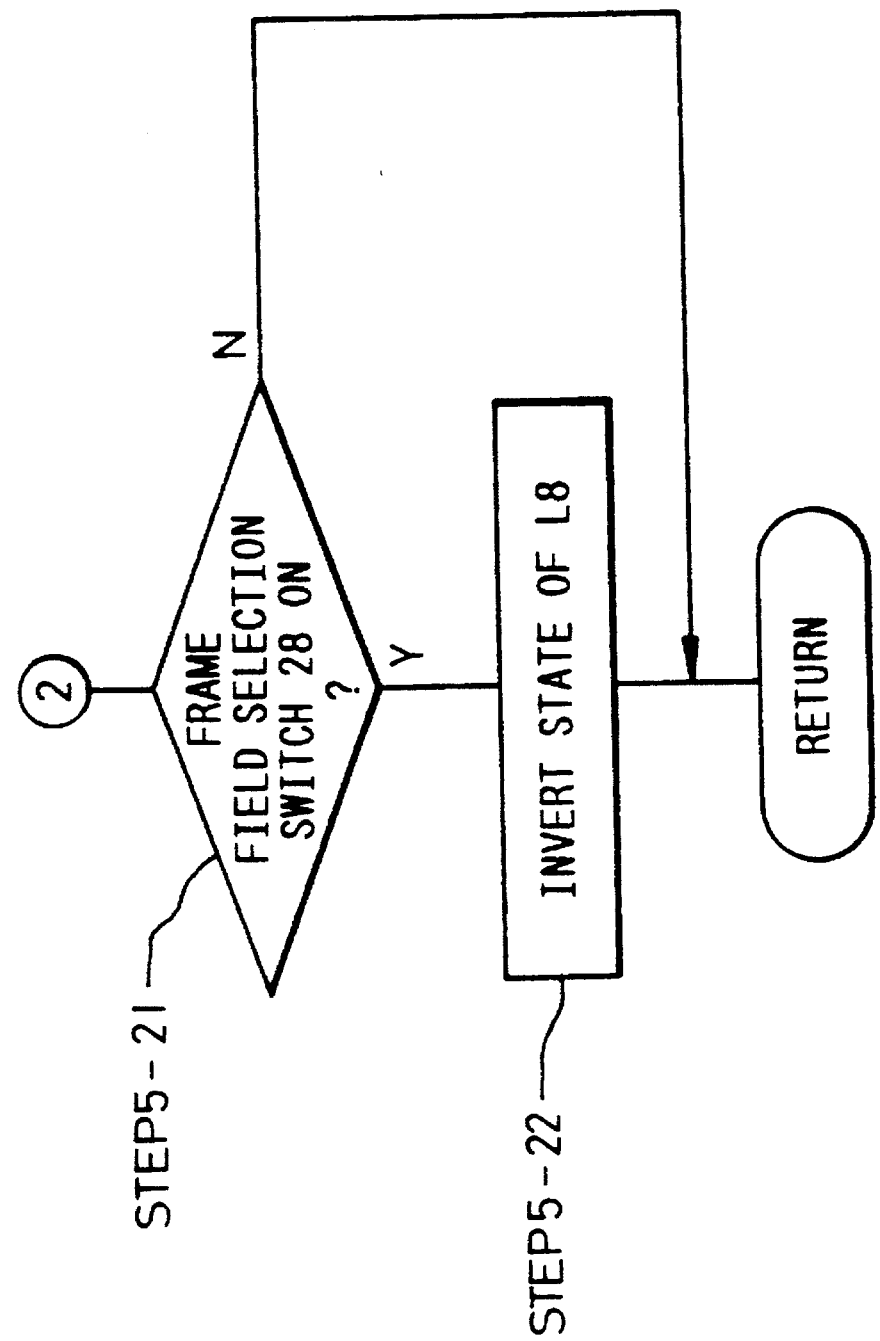

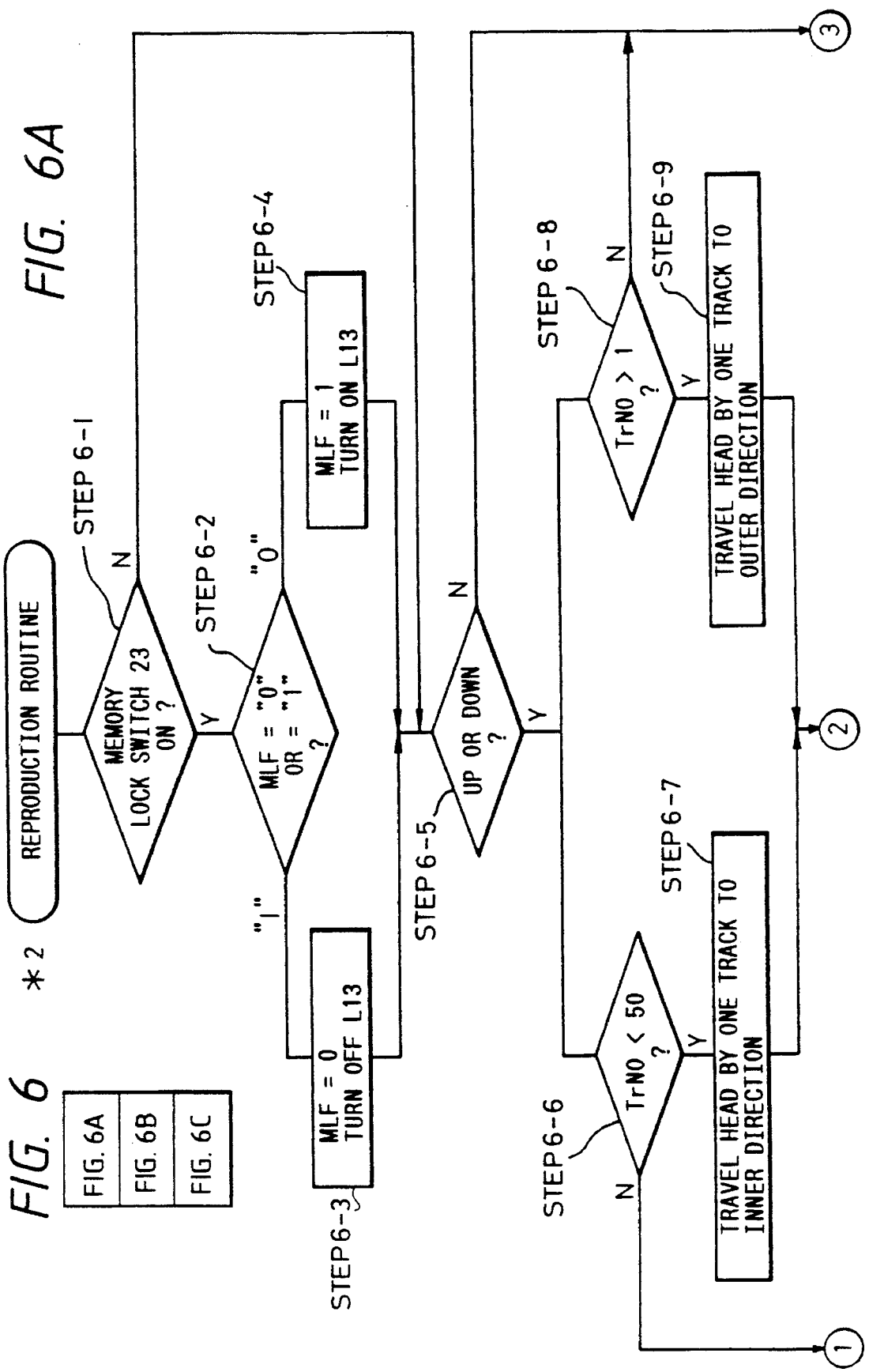

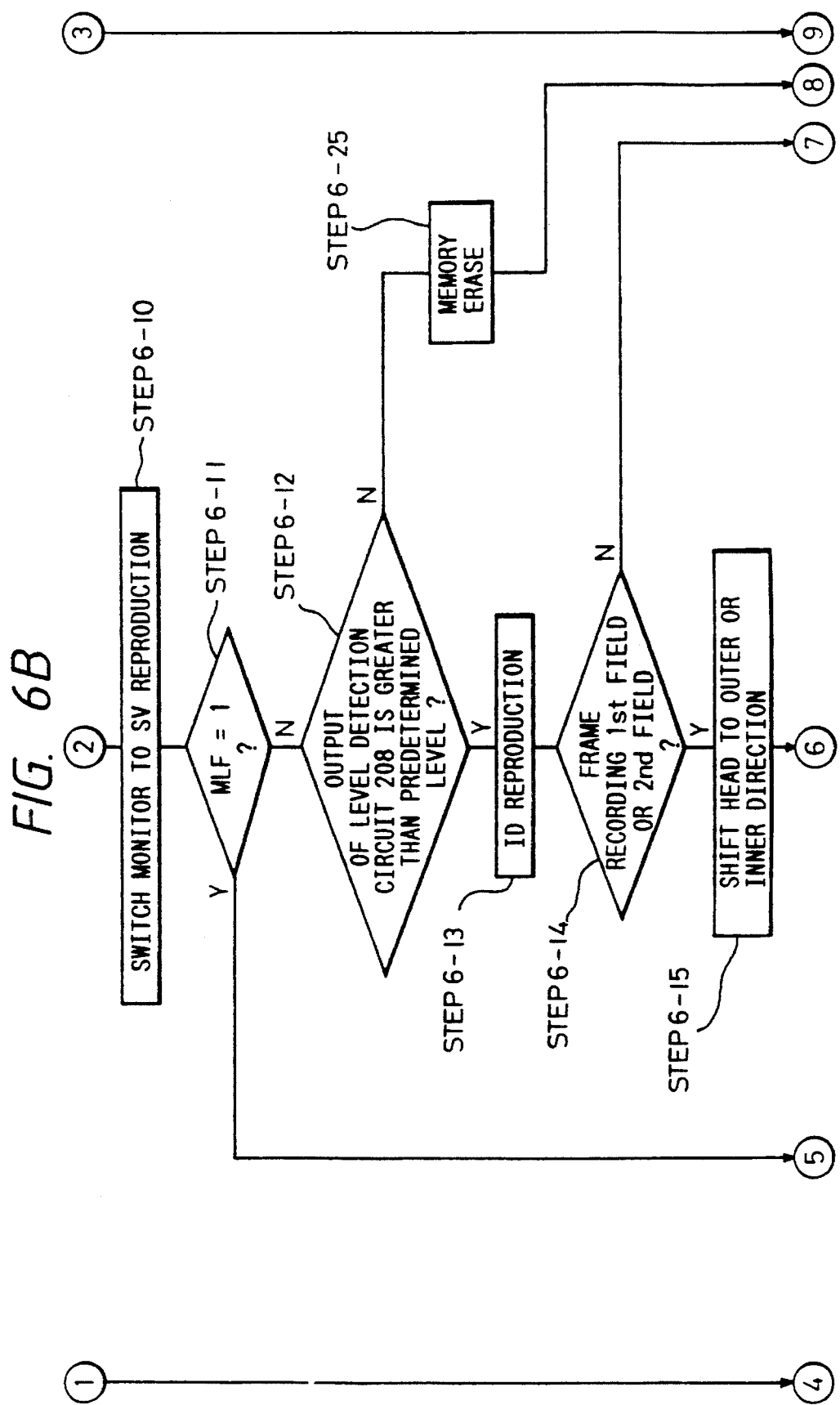

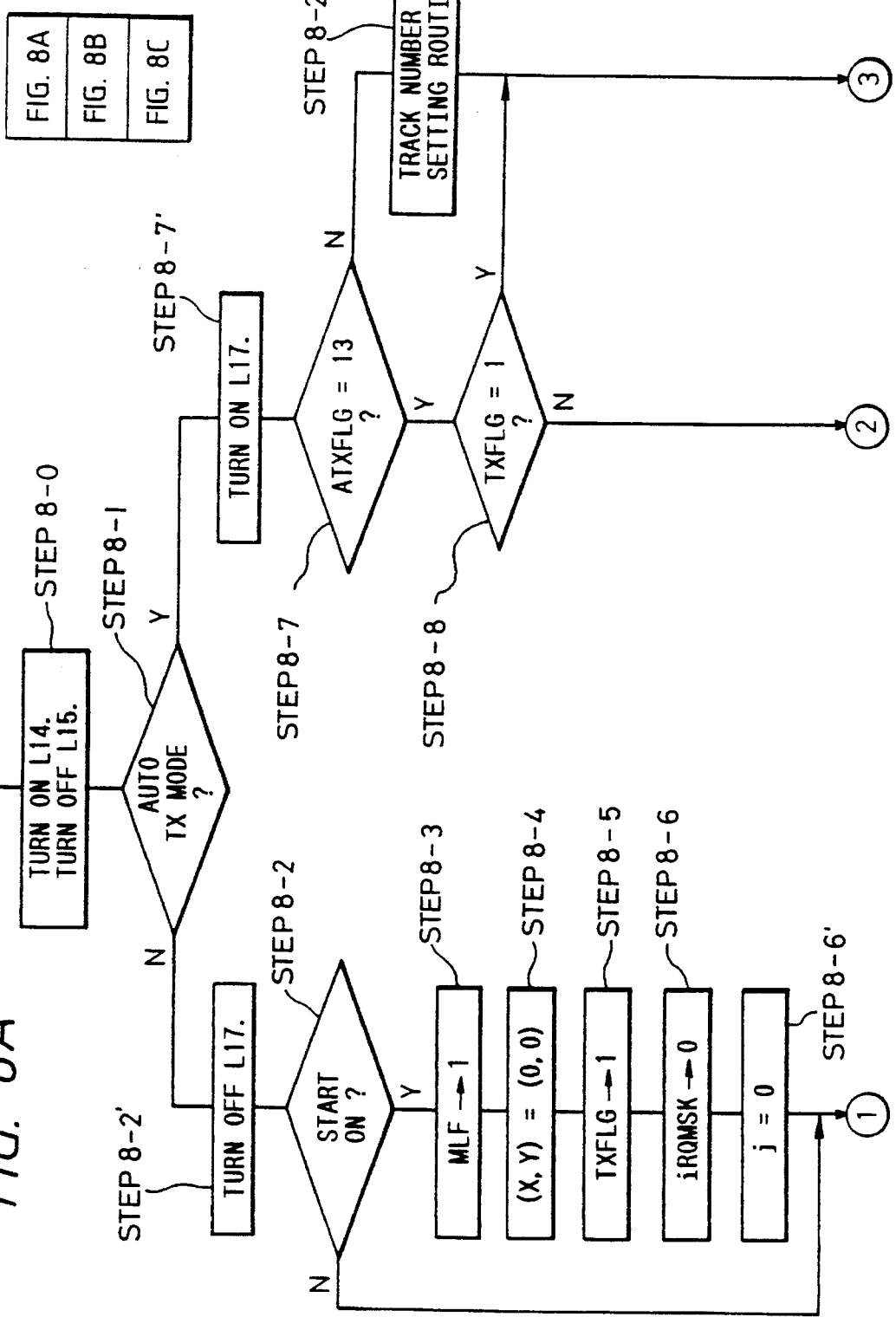

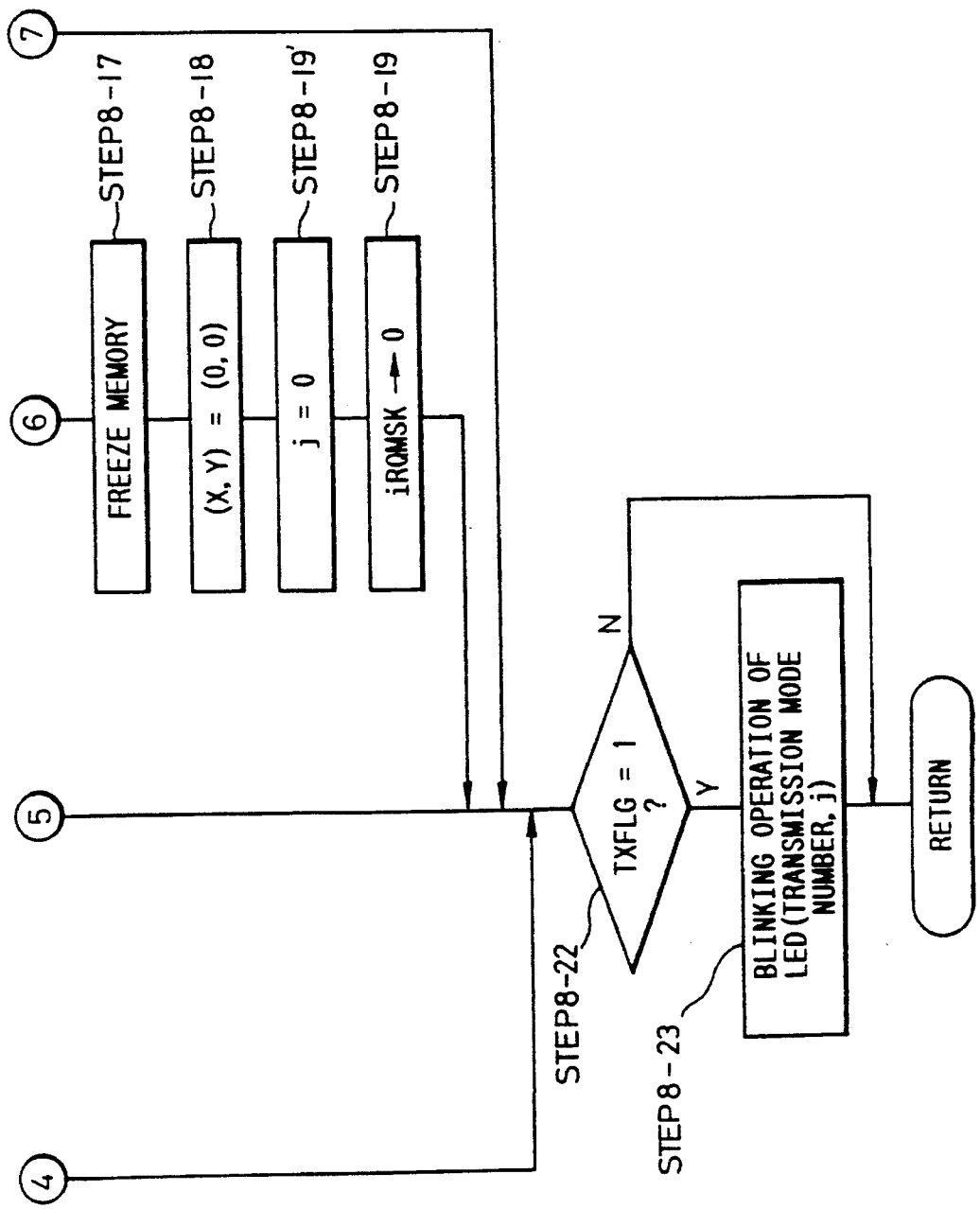

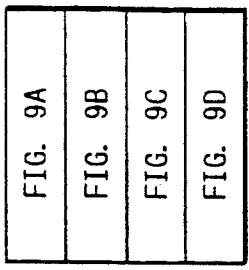
FIG. 9
| FIG. 9A |
| FIG. 9B |
| FIG. 9C |
| FIG. 9D |
FIG. 9A
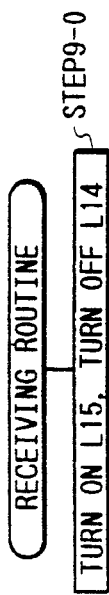
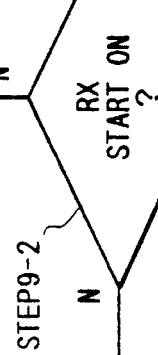
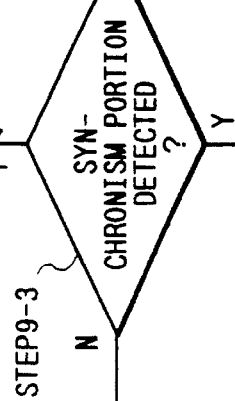

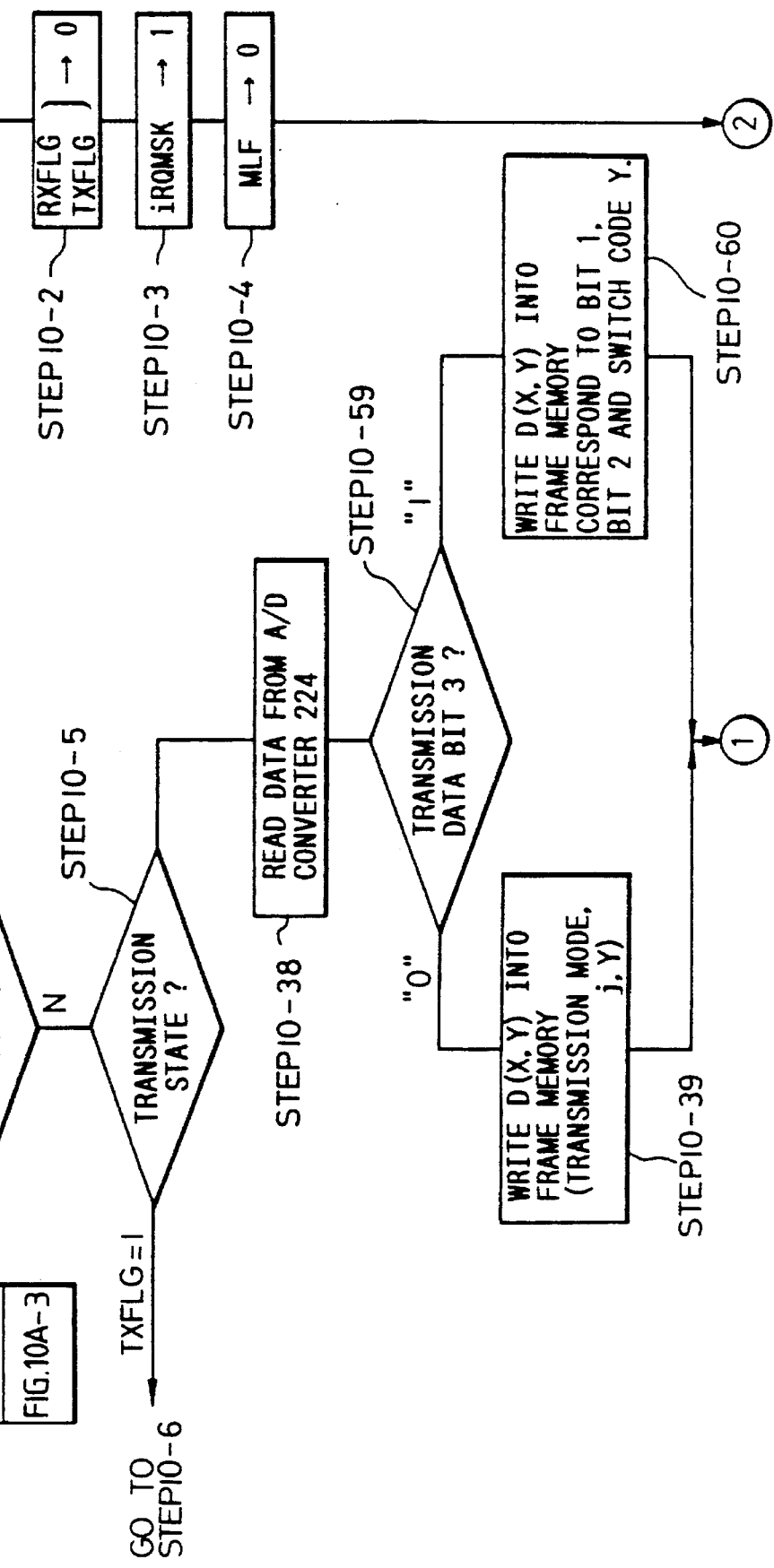

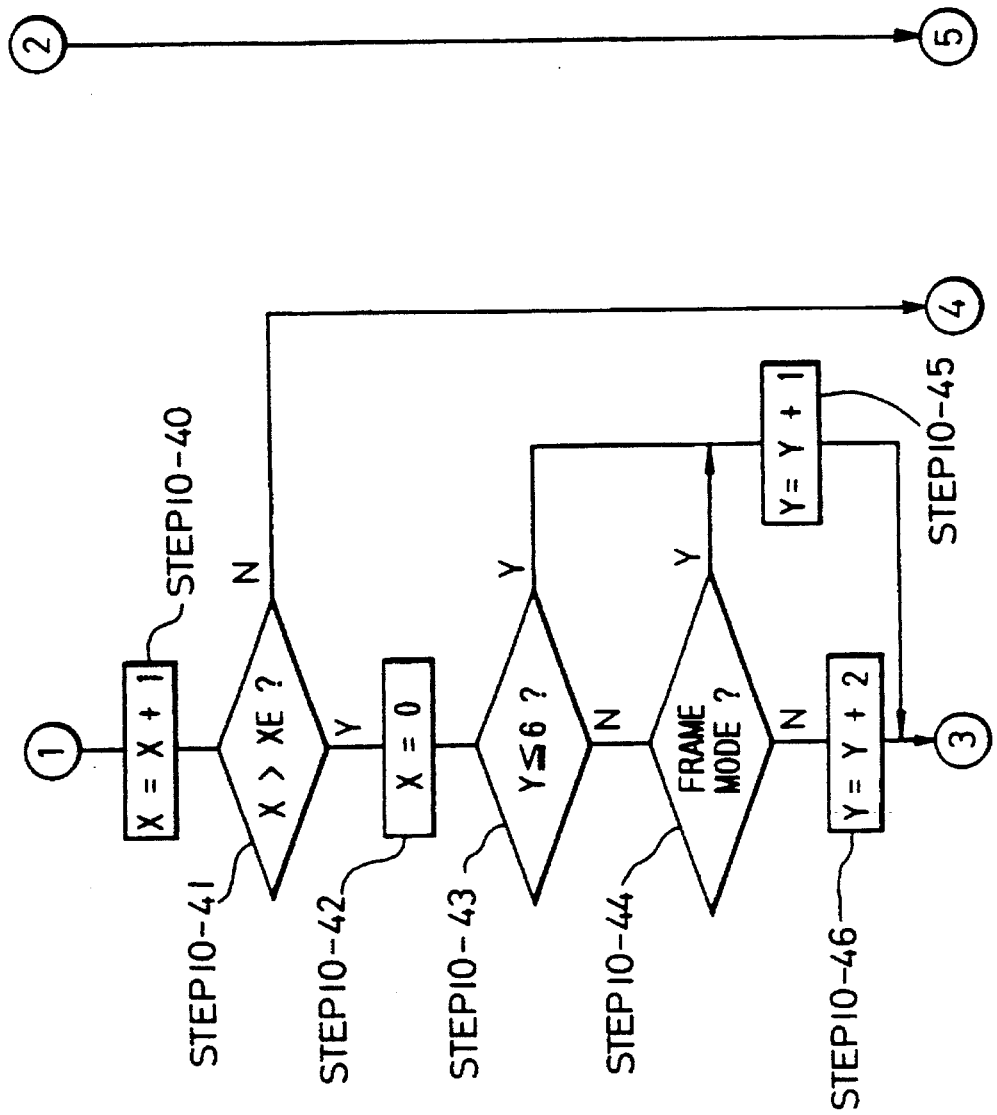

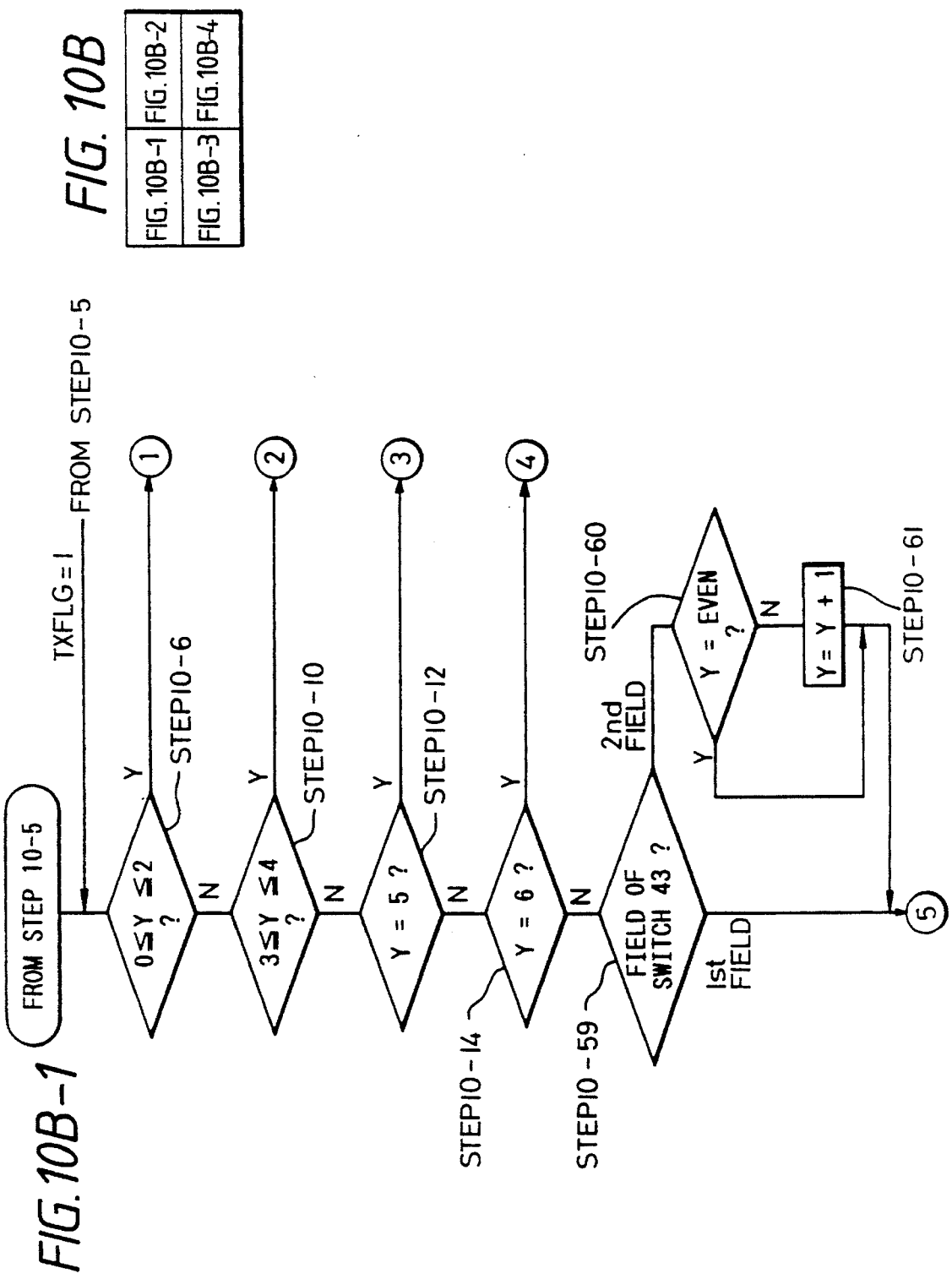

IMAGE TRANSMISSION APPARATUS INDICATING A COLOR TYPE OF THE COLOR SIGNAL TRANSMITTED

This application is a division of application Ser. No. 07/888,442 filed May 28, 1992, which is a continuation of application Ser. No. 07/772,129 filed Oct. 9, 1991, now abandoned, which is a continuation of application Ser. No. 07/393,660 filed Aug. 14, 1989, now abandoned, which is a divisional of U.S. Ser. No. 07/052,740, filed May 20, 1987, now U.S. Pat. No. 4,910,604, issued Mar. 20, 1990.

BACKGROUND OF THE INVENTION

1. Field of the Invention

The present invention relates to an image transmission apparatus and, more particularly, to an image transmission apparatus suitable for transmitting a still image.

2. Related Background Art

A conventional still image transmission apparatus is available in which still images reproduced from a magnetic sheet such as a video floppy disk are temporarily stored in an image memory and are sequentially read out according to a data transmission rate. In such an apparatus, a plurality of color signals are sequentially transmitted in units of frames. According to conventional techniques, after a transmission start command is given, a display is performed so as to indicate that image information is being transmitted. However, a transmission color mode display representing which color information is sent and a display representing which frame consisting of color signals is being sent are not performed.

If a transmission fails due to a transmission line failure, the sender does not understand which frame consisting of image signals was being sent. As a result, appropriate processing cannot be performed.

An image signal and frequency-multiplexed data (to be referred to as ID data hereinafter) associated with the image signal are stored in a video floppy disk.

However, in a conventional transmission apparatus, the image signal reproduced from the recording medium can be transmitted, but the ID data cannot be transmitted.

The ID data is lost in the transmission of such an image signal, and thus the image signal cannot be effectively utilized on the basis of the ID data.

Another conventional transmission apparatus utilizing a plate cylinder is known as a still image information transmission apparatus.

When a plurality of still images are to be transmitted in the above apparatus, the plate must be replaced for every transmission cycle.

Still another conventional transmission apparatus is also plausible to reproduce still image information, store it in a memory, and then transmit the stored still image information with the time base being changed.

In order to send a plurality of still images in any conventional apparatus, the reproduction position must be manually set and the information must be sent after manual adjustment.

SUMMARY OF THE INVENTION

It is an object of the present invention to provide an image transmission apparatus which solves one or all conventional problems described above.

It is another object of the present invention to provide an image transmission apparatus which allows an operator to properly check an image transmission state.

It is still another object of the present invention to provide an image transmission apparatus which allows an operator to perform appropriate processing when a transmission failure occurs during image transmission.

In order to achieve the above objects of the present invention, according to an aspect thereof, there is provided an image transmission apparatus for separating still image information into a plurality of color signals and transmitting the plurality of color signals, comprising a display means for displaying a type of a color signal during transmission, thereby displaying the type of the color signal during transmission on the display means and hence allowing the operator to properly check the transmission state.

It is still another object of the present invention to provide an image transmission apparatus capable of effectively displaying an image transmission state.

It is still another object of the present invention to provide an image processing apparatus capable of effectively displaying the types of feature components on a monitor after an image is separated into a plurality of types of feature components.

In order to achieve these two objects of the present invention, according to another aspect thereof, there is provided an image processing apparatus having a first mode for separating still image information into a plurality of color signals and transmitting the color signals and a second mode for selecting each color signal and supplying it to a monitor, wherein a display means displays a type of a color signal supplied to the monitor in the first mode and displays a transmitted color signal in the second mode, thereby performing effective display.

It is still another object of the present invention to provide an image transmission apparatus capable of appropriately controlling transmitting and receiving operations according to a transmission mode.

It is still another object of the present invention to provide an image transmission apparatus capable of appropriately controlling transmitting and reception apparatuses according to a detection result that an image signal to be transmitted is a field or frame image signal.

In order to achieve these two objects of the present invention, according to still another aspect thereof, there are provided a transmission apparatus having a field video transmission mode for transmitting a field image signal and a frame video transmission mode for transmitting a frame image signal, the transmission apparatus being adapted to transmit the image signal together with a discrimination signal representing which one of the field and frame video transmission modes is set, and a reception apparatus for storing the image signal in a storing means, the reception apparatus being provided with a detecting means for detecting the discrimination signal representing which one of the field and frame image signal modes is set, and control means for setting a storage mode of the storing means on the basis of the discrimination signal detected by the detecting means.

It is still another object of the present invention to provide a transmission apparatus capable of properly transmitting image information and a data signal recorded in a recording medium when image information recorded in the recording medium is to be transmitted.

In order to achieve the above object of the present invention, there is provided a still image transmission apparatus wherein a still image signal is reproduced from a recording medium in which a still image is stored together with a data signal associated therewith, and the still image signal and the data signal are time-divisionally output outside the apparatus.

It is still another object of the present invention to provide an image processing apparatus wherein an input image signal can be properly written in a memory regardless of the type of image signal when it is written in the memory.

In order to achieve the above object of the present invention, according to still another aspect thereof, there is provided an image processing apparatus for receiving a field image signal and a frame image signal consisting of the field image signals, comprising a discriminating means for discriminating that an input image signal is the field or frame image signal, a storing means, and control means for controlling a storage state of the storing means on the basis of a discrimination result of the discriminating means.

It is still another object of the present invention to provide an image transmission apparatus capable of properly transmitting a plurality of continuous still images while the time base is being converted.

It is still another object of the present invention to provide an information processing apparatus having a new and improved function or an information processing apparatus for an image or the like.

The above and other objects, features, and advantages of the present invention will be apparent from the detailed description of the preferred embodiment taken in conjunction with the accompanying drawings.

BRIEF DESCRIPTION OF THE DRAWINGS

FIG. 2 is a timing chart showing data transmitted by the apparatus shown in FIG. 1A;

FIG. 3 is a schematic view showing memory addresses of memories 213 to 215 and 250; and FIGS. 4 to 11 are flow charts for explaining the operation of a control circuit shown in FIG. 1A, in which FIG. 4 is a flow chart showing the basic operation thereof, FIGS. 5A, 5A-1, 5A-2, 5A-3, and FIGS. 5B, 5B-1, 5B-2, and 5B-3 are flow charts for explaining an initial operation routine, FIGS. 6, 6A, 6B, and 6C comprise a flow chart for explaining a reproduction routine, FIG. 7 is a flow chart for explaining a recording routine, FIGS. 8, 8A, 8B, and 8C comprise a flow chart for explaining a TX (transmission) routine, FIGS. 9, 9A, 9B, 9C, and 9D comprise a flow chart for explaining a receiving routine, FIGS. 10A, 10A-1; 10A-2, 10A-3, and FIGS. 10B, 10B-1, 10B-2, 10B-3, and 10B-4 are flow charts for explaining interrupt processing performed while the flows in FIGS. 8 and 9 are executed, and FIGS. 11, 11A and 11B comprise a flow chart for explaining a track number setting routine executed when a track number is to be programmed.

DETAILED DESCRIPTION OF THE PREFERRED EMBODIMENT

The following preferred embodiment will exemplify a transmission apparatus in which still image information recorded in a magnetic sheet is reproduced, color balance of the reproduced still image information is adjusted, the resultant information is transmitted to a destination apparatus, and information sent back from this destination apparatus can be received and recorded in the magnetic sheet.

Figure 1A:
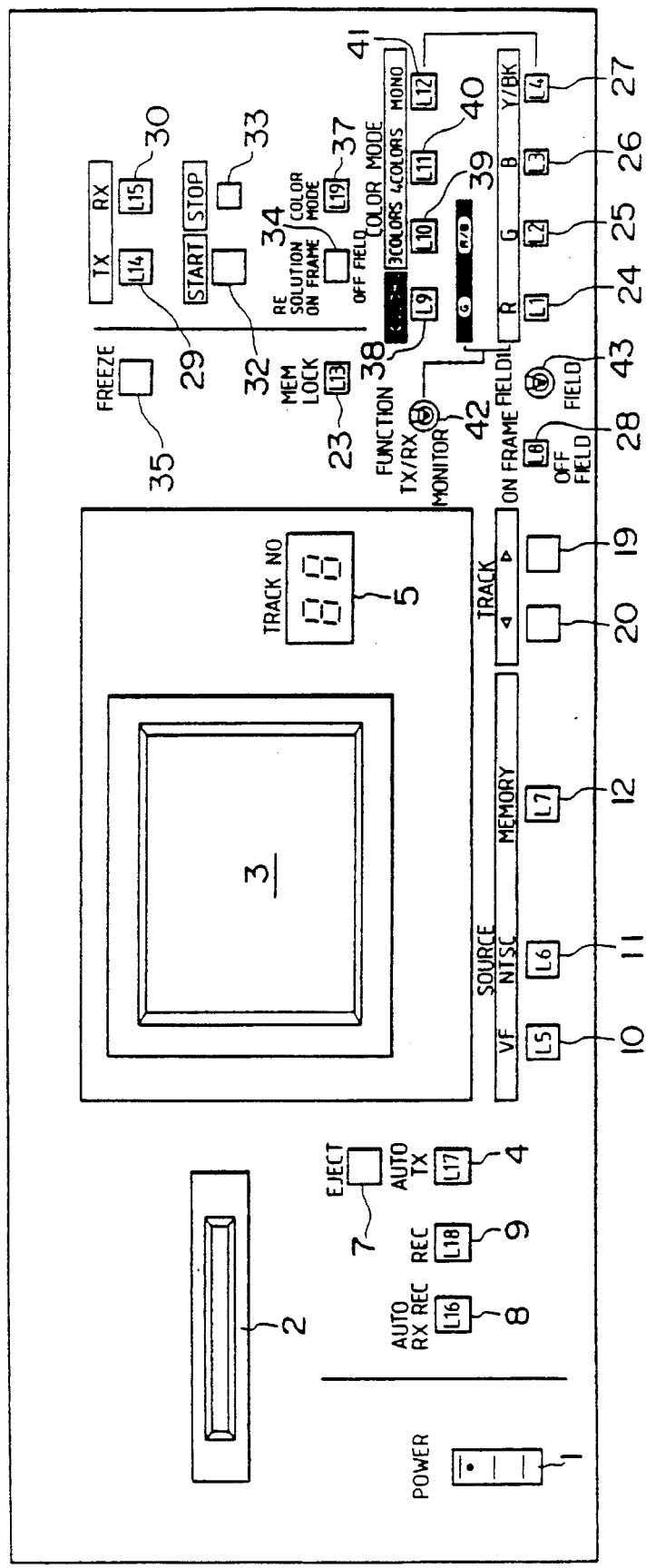
FIG. 1A is a front view of an image transmission apparatus according to an embodiment of the present invention.
Figures 1, 1B, 2:
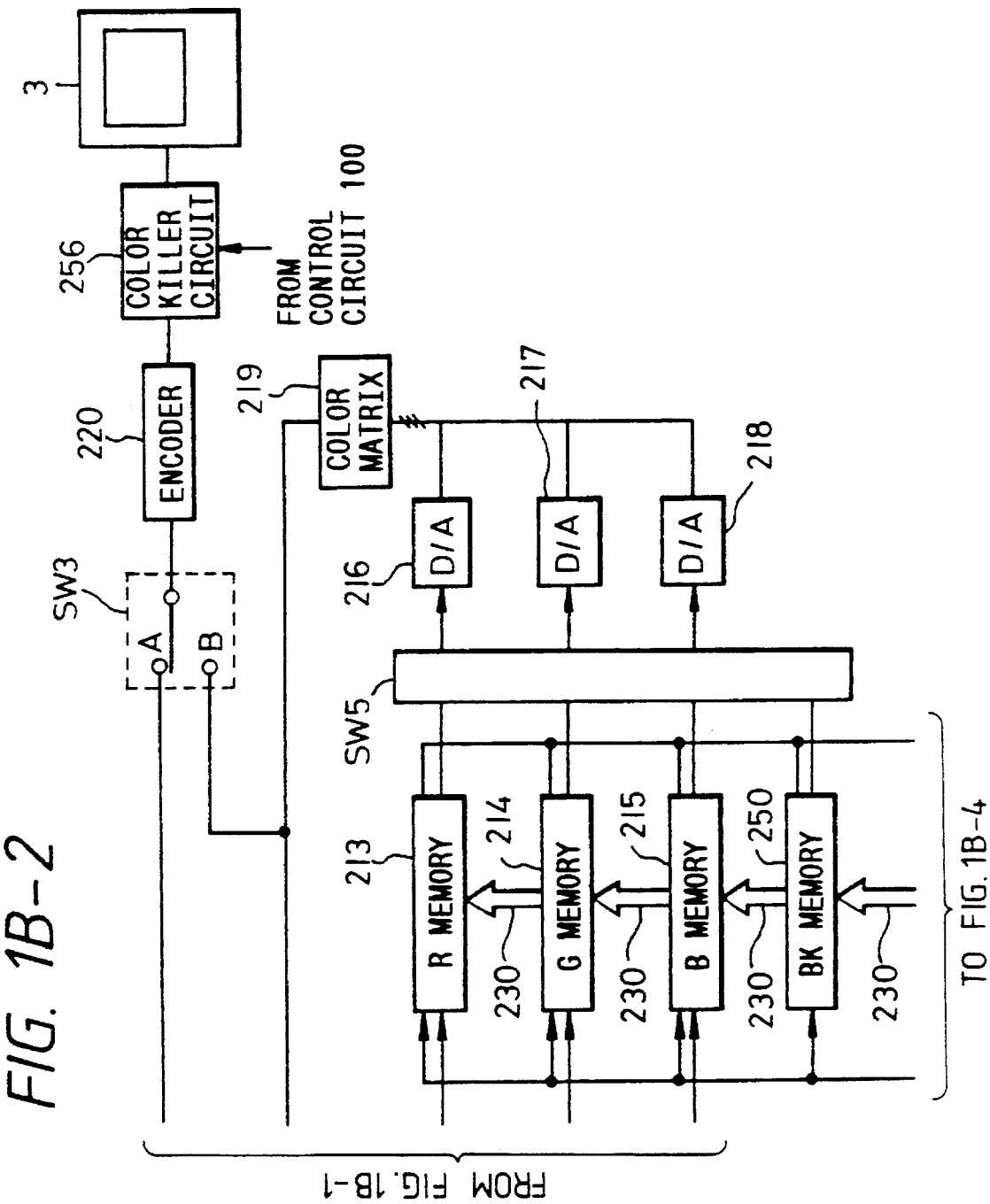
FIGS. 1B-1, 1B-2, 1B-3, and 1B-4 comprise a block diagram showing an arrangement of the apparatus shown in FIG. 1A.
Figure 2:
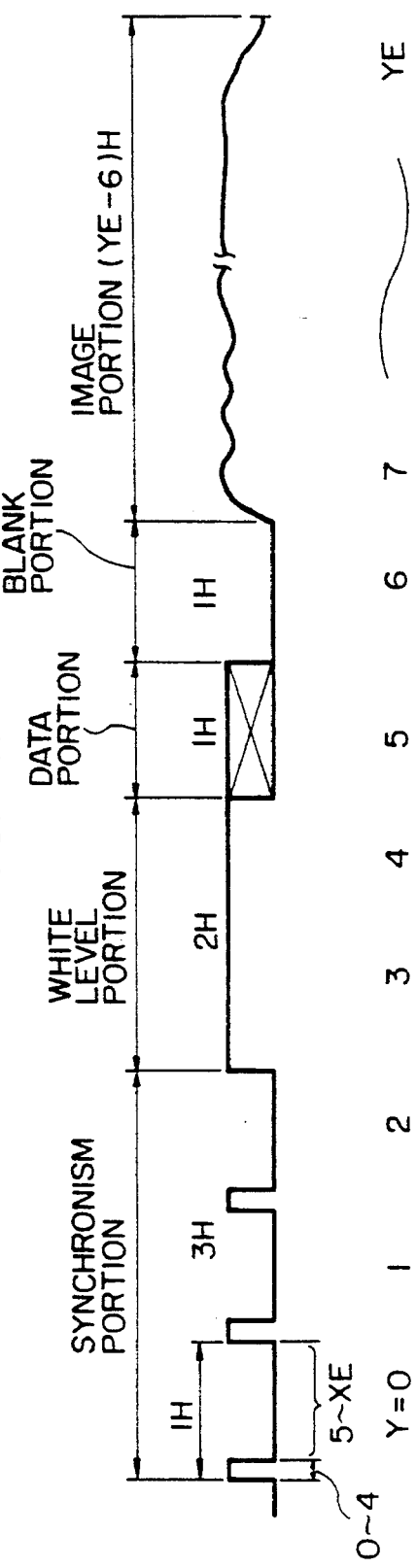

FIG. 1A is a front view of an image transmission apparatus according to an embodiment of the present invention, and FIG. 1B is a block diagram showing a detailed arrangement of the apparatus.

(Arrangement of Image Transmission Apparatus)

Referring to FIG. 1A, a POWER switch 1 is arranged at the lower left corner of the front panel of the apparatus. A video floppy slot 2 is formed above the POWER switch 1 in the front panel. A video floppy having a magnetic sheet is inserted in the video floppy slot 2. A monitor display 3 is arranged substantially at the central portion of the front panel. An AUTO TX switch 4 is arranged at a lower left portion of the front panel to select an automatic reproduction/transmission mode for automatically reproducing a plurality of still images and sequentially transmitting the still images frozen (written) in the memory. The switch 4 is constituted by a self-illuminating switch including an LED L17 which is turned on when the switch 4 is turned on. A START switch 32 is arranged at the upper right portion of the front panel and is designed to start automatic reproduction/transmission.

However, in this case, a track number must be input using a program. Otherwise, even if the START switch 32 is turned on, automatic transmission is not started. A track number setting circuit 255 (to be described in detail later) is arranged to set a track number by using a program.

A 2-digit, 7-segment LED 5 is arranged to the right of the monitor display 3 and displays a track number, the number of empty tracks, and other display contents. An eject (EJECT) switch 7 is arranged right above the AUTO TX switch 4 to eject the video floppy disk through the slot 2. An AUTO RX REC switch 8 is arranged to the left of the AUTO TX switch 4 to perform automatic receiving/recording. The switch 8 is formed integrally with an LED L16. A REC switch 9 is arranged between the AUTO TX and AUTO RX REC switches 4 and 8 to record information in the magnetic sheet. If information can be recorded in the recording mode, i.e., a track accessed by a head 205 (to be described in detail later) is an empty or unrecorded track, an LED L18 arranged integrally with the REC switch 9 is turned on.

Source selection switches comprising a VF (Video Floppy) switch 10, an NTSC switch 11, and a MEMORY switch 12 are arranged below the monitor display 3. The VF switch 10 is designed to switch a signal source to be reproduced on the monitor display 3 to a VF side. Upon depression of the VF switch 10, a reproduction mode is set such that information is reproduced from the video floppy disk. The VF switch 10 is formed integrally with an LED L5 which is turned on when the switch 10 is turned on. The NTSC switch 11 switches the signal source to be reproduced on the monitor display 3 to an external input NTSC signal side. Upon depression of the NTSC switch 11, an external input can be visually observed on the monitor display 3 with an EE. The NTSC switch 11 is arranged integrally with an LED 16 which is turned on when the switch 11 is turned on. The MEMORY switch 12 switches the signal source to be reproduced on the monitor display 3 to a reproduction image stored in a built-in frame memory (to be described later). The MEMORY switch 12 is arranged integrally with an LED L7 which is turned upon operation of the switch 12.

When an external input or a built-in frame memory is selected as a signal source to be reproduced on the monitor display 3, the apparatus is automatically set in the recording mode to determine whether the track accessed by the head is an empty track. If so, the LED L18 is turned on to signal to the operator that information can be recorded. However, if the accessed track is a full track, the LED L18 is turned off to signal to the operator that recording cannot be performed. Therefore, the user or operator can know that the image displayed on the monitor display can be recorded or not on the magnetic sheet.

Track number switches comprising track UP and DOWN switches 19 and 20 are arranged below the 7-segment LED 5. The switch 19 shifts the head in the inner direction of the magnetic sheet, i.e., in a direction where the track number of the magnetic sheet is increased. The switch 20 shifts the head in the outer direction of the magnetic sheet, i.e., in a direction where the track number of the magnetic sheet is decreased.

A MEM LOCK (memory lock) switch 23 is located to the right of the 7-segment LED 5 and is arranged to prevent erasure of the contents of the frame memory. In the memory lock mode, the switch 23 and an LED L13 arranged integrally therewith are turned on. However, in the memory lock release mode, the switch 23 and the LED L13 are turned off.

Single color setting switches 24, 25, 26, and 27 are arranged in line at the lower left portion of the front panel. The switches 24 to 27 are used to set single colors, i.e., red (R), green (G), blue (B), and black (Bk) components, in both modes of the TX monitor mode. LEDs L1, L2, L3, and L4 are respectively arranged integrally with the switches 24 to 27 and are selectively turned on or blink according to sequences to be described later. The switches and the corresponding LEDs are used to indicate which of the above-mentioned four color components is displayed when a signal from the frame memory is reproduced and displayed on the monitor display 3. In addition, these switches and the corresponding LEDs are used as display means for representing that the color display mode is set. More specifically, a signal is read out from one of an R memory 213, a G memory 214, and a B memory 215, and the single color display mode is set. Moreover, the LEDs L1, L2, L3, and L4 are used as means for indicating transmission/reception states, i.e., a correspondence between the currently transmitted or received signal and the memory.

A FRAME/FIELD switch 28 is arranged to the right of the track UP switch 19 and is operated synchronously with an LED L8 to switch between the field and frame modes in the freezing operation. The LED L8 is turned on (ON) in response to an ID signal derived from the image signal reproduced from the video floppy disk when the image signal is frozen in response to a frame signal. However, the LED L8 is turned off (OFF) when the image signal is frozen in response to a field signal.

A TX (transmission) mode switch 29 is arranged at the upper right portion of the front panel to set a TX mode and is synchronously operated with an LED L14 for indicating that the TX mode is set upon operation of the switch 29. An RX (receiving) mode switch 30 is located to the right of the TX mode switch 29 to set an RX mode. An LED L15 is arranged integrally with the switch 30 to indicate that the receiving mode is set upon operation of the switch 30.

The START switch 32 is located below the TX mode switch 29 to start a transmission operation. A STOP switch 33 is located to the right of the START switch 32 to interrupt the transmission.

A RESOLUTION switch 34 is arranged below the START switch 32 to select the frame or field transmission mode as the transmission mode.

A FREEZE switch 35 is located to the left of the TX switch 29 to freeze the image signal in a memory (to be described later). A COLOR MODE switch 37 is located to the right of the RESOLUTION switch 34 to select one of the four TX modes: a two-color TX mode for transmitting the G component of the image signal and then the B and R components thereof in the order named; a three-color TX mode for sequentially transmitting the R, G, and B components in the order named; a four-color TX mode for sequentially transmitting the R, G, B, and Bk components in the order named; and a monochromatic TX mode for transmitting only a monochromatic signal Y. The switch 37 is synchronously arranged with an LED L19. The two-, three-, and four-color TX modes, and the monochromatic TX mode are cyclically changed whenever the switch 37 is depressed.

LEDs L9, L10, L11, and L12 respectively serve as two-, three- and four-color TX mode LEDs and a monochromatic TX mode LED, each of which is turned on upon operation of the COLOR MODE switch 37 or in the automatic RX mode when a function switch 42 is set in the TX/RX position.

The COLOR MODE switch 37 serves as a monitor display mode switching function when the function switch 42 is set in the MONITOR position.

The function switch 42 serves as a switch for setting a TX mode using the COLOR MODE switch 37 or a TX/RX MONITOR switching switch for setting a monitor display mode, as is apparent from the above description.

A switch 43 is located between the switches 28 and 24 and sets a destination memory area of an odd- or even-numbered line in which the image signal is frozen upon selection of the field mode by the FIELD/FRAME switch 28.

FIGS. 1B-1, 1B-2, 1B-3, and 1B-4 comprise block diagram showing an internal arrangement of the image transmission apparatus of this embodiment.

Referring to FIGS. 1B-1, 1B-2, 1B-3, and 1B-4, the image transmission apparatus includes a control circuit 100 as a principal circuit. A disk-like magnetic sheet 201 is inserted in the video floppy slot 2 and is subjected to image signal recording or reproduction. In this embodiment, concentric tracks 50 are formed on the magnetic sheet. A one-field image signal can be recorded in each track.

A motor 202 drives the magnetic sheet 201 at a predetermined speed (3,600 rpm in the NTSC scheme) synchronized with a vertical sync signal of the image signal.

A head 205 is supported by a head carriage 203. Upon operation of a step motor 204, a position of the magnetic sheet 201 accessed by the head 205 supported by the head carriage 203 can be controlled. In this embodiment, the head 205 is used in both reproduction and recording modes. A driver 206 is connected to the step motor 204 to drive the step motor 204. A drive signal for the step motor 204 is generated on the basis of a control signal from the control circuit 100. The control circuit 100 is operated to change an access position of the head 205 on the magnetic sheet 201 upon operation of the track UP or DOWN switch 19 or 20 or to supply the control signal to the driver 206 when a track recording state detection operation (to be described later) is performed. A reproduction process circuit 207 is connected between switches SW1 and SW2 to perform processing such as preamplification, clamping, or the like of the output reproduced from the track on the magnetic sheet 201 accessed by the head 205.

A level detection circuit 208 is connected between the switch SW1 and the control circuit 100. The detection circuit 208 detects whether an image signal is recorded in the track of the magnetic sheet 201 which is accessed by the head 205. When the head 205 accesses the magnetic sheet 201 and a signal is recorded on the accessed track, the output from the head 205 exceeds a predetermined output level. Otherwise, the level of the output reproduced from the head 205 is less than the predetermined level. In this manner, the level detection circuit 208 detects a full or empty track by detecting the output level of the head 205. An RGB matrix circuit 209 is selectively connected to the reproduction process circuit 207 or a decoder 222 to receive a processed signal therefrom. The RGB matrix circuit 209 then separates the processed signal into the R, G, and B components.

The output signal lines of the RGB matrix circuit 209 are respectively connected to A/D converters 210, 211, and 212. The A/D converters 210, 211, and 212 convert analog R, G, and B components into digital R, G, and B signals.

The outputs of the A/D converters 210, 211, and 212 are respectively connected to inputs of R, G, and B memories 213, 214, and 215. The A/D-converted R, G, and B components are respectively stored in the R, G, and B memories 213, 214, and 215. Each memory stores a one-frame color signal. The memories 213, 214, and 215 also serve as memories for storing the transmitted image signal. A Bk (black) memory 250 is arranged for the four-color TX mode. The R, G, B, and Bk memories 213, 214, 215, and 250 are controlled by a memory controller 223 through control lines 230.

The outputs of the R, G, and B memories 213, 214, and 215 are respectively connected to D/A converters 216, 217, and 218. The D/A converters 216, 217, and 218 receive the digital R, G, and B signals from the R, G, and B memories 213, 214, and 215 through a switch SW5 and convert them into analog R, G, and B signals. The outputs of the D/A converters 216, 217, and 218 are connected to a color difference matrix circuit 219. The color matrix circuit 219 processes the R, G, and B components into color difference signals R-Y and B-Y, and a luminance signal Y. An encoder 220 modulates the color difference signals R-Y and B-Y and the luminance signal Y from the color difference matrix circuit 219 through a switch SW3 and supplies a standard NTSC television signal to the monitor display 3.

The decoder 222 receives an external standard NTSC television signal through an external input terminal 221 and decodes it to output color difference signals R-Y and B-Y and a luminance signal Y. The memory controller 223 controls read/write access of the R, G, B, and Bk memories 213, 214, 215, and 250, as described above. Moreover, the memory controller 223 controls write access for writing outputs from an A/D converter 224 in the R, G, B, and Bk memories 213, 214, 215, and 250 and read access for reading out the signals from the R, G, and B memories 213, 214, and 215 and supplying the readout signals to a D/A converter 226. Furthermore, the controller 223 calculates the Bk (black) component.

A modulated signal i.e., the modulated signals received as time-serial R, G, and B signals, received through a telephone line 231 is decoded by a demodulator 225. The output of the demodulator 225 is connected to the A/D converter 224 controlled by the memory controller 223. The output from the demodulator 225 is converted by the A/D converter 224 into digital signals, and the digital signals are stored in the R, G, B, and Bk memories 213, 214, 215, and 250 through the memory controller 223.

As described above, the memory controller 223 controls the read access of the R, G, B, and Bk memories 213, 214, 215, and 250. The readout signals are converted by the D/A converter 226 into analog signals. These analog signals are modulated into a standard NTSC television signal and are sent out through the telephone line 231 by a modulator 227.

The conversion rate of the A/D converter 224 is smaller than that of each of the A/D converters 210, 211, and 212, and the conversion rate of the D/A converter 226 is smaller than that of each of the converters 216, 217, and 218. Higher conversion rates are required for the A/D converters 210, 211, and 212 and the D/A converters 216, 217, and 218 since read/write access of the memories 213, 214, and 215 must be completed within a one-field period of the standard television signal. However, only lower video conversion rates are required for the A/D converter 224 and D/A converter 226 since read/write access of the memories 213, 214, and 215 can be completed within a few minutes through the telephone lines having a narrow bandwidth.

A reception detection circuit 228 is connected to the inputs of the demodulator 225 and the modulator 227. The reception detection circuit 228 detects a ringing signal (corresponding to a ringing tone from a telephone set) sent prior to transmission of the video signal through the telephone line 231 and generates a reception command signal.

As described with reference to FIG. 1A, the monitor display 3 displays the standard television signal input through a color killer circuit 256.

A magnetic sheet detection circuit 232 is designed to detect the presence/absence of the magnetic sheet 201 on the basis of signals from photointerrupters 232-A and 232-B. If the magnetic sheet 201 is present between the photointerrupters 232-A and 232-B, the optical path therebetween is shielded. Otherwise, the optical path is not shielded. The magnetic sheet detection circuit 232 detects a difference between the outputs from the photointerrupters 232-A and 232-B and sends a detection result to the control circuit 100.

The input of a recording process circuit 233 is connected to a switch SW4 to receive the signals. The process circuit 233 modulates the input signals and sends the modulated signal to the head 205.

A display circuit 235 is connected to the control circuit 100 and is driven in response to an output therefrom. The dislay circuit 235 controls the LEDs L1 to L19 and the 7-segment LED 5. For example, numerical values representing an automatic RX disable state and the number of remaining recordable frames in the automatic RX mode are displayed on the 7-segment LED 5.

A motor drive circuit 236 is connected to the control circuit 100 so that the ON/OFF state of the drive circuit 236 is controlled in response to a control signal from the control circuit 100.

The input of an ID signal detection circuit 251 is commonly connected to the input of the level detection circuit 208 and detects an ID signal frequency-superposed on the image signal reproduced from the magnetic sheet 201. The ID signal is input to the control circuit 100.

The input of an interrupt counter 253 is connected to the reset port of the control circuit 100 and the output of the interrupt counter 253 is connected to the IRQ port thereof to cause the control circuit 100 to execute interrupt processing.

A track number setting circuit 255 is connected to the control circuit 100 to program a track number for automatic TX. The track number setting circuit 255 includes UP and DOWN switches 263 and 264 for shifting the head inward and outward, respectively, a setting switch 260 for rendering the track number setting circuit 255 operative, a switch 261 for causing the control circuit 100 to fetch a track number of interest in the transmission mode, and an end switch 262 for terminating a track number setting operation.

The color killer circuit 256 causes the monitor display 3 to perform monochromatic display on the basis of only the luminance signal in the monochromatic or single color display mode. The ON/OFF operation of the color killer circuit is controlled by the control circuit 100.

The switch SW1 connects the head 205 to the reproduction process circuit 207 in the reproduction mode and the head 205 to the recording process circuit 233 in the recording mode.

The switch SW2 connects the decoder 222 to the switch SW3 when the image signal input through the external input terminal 221 is output to the monitor display 3. The switch SW2 connects the reproduction process circuit 207 to the switch SW3 when the image signal reproduced from the magnetic sheet 201 is output to the monitor display 3.

The switch SW3 causes the switch SW2 to select the encoder 220 when the image signal reproduced from the magnetic sheet 201 or the image signal input through the external input terminal 221 is output to the monitor display 3. The switch SW3 connects the color difference matrix circuit 219 to the encoder 220 when the image signal stored in the R, G, B, and BK memories 213, 214, 215, and 250 is output to the monitor display 3.

The switch SW4 connects the color difference matrix circuit 219 to the recording process circuit 233 when the image signal stored in the R, G, and B memories 213, 214, and 215 is recorded in the magnetic sheet 201. The switch SW4 connects the decoder 222 to the recording process circuit 233 when the image signal input through the external input terminal 221 is recorded in the magnetic sheet 201.

The switch SW5 controls which signals read-out from the R, G, B, and Bk memories 213, 214, 215, and 250 are sent to which D/A converters 216 to 218. The detailed operations of the switch SW5 will be described later.

The operating states of the switches SW1 to SW5 are controlled by the control circuit 100.

represents the time base, and the ordinate therein represents the transmission data level. Numbers written along the abscissa represent memory addresses corresponding to the transmission data. The data consists of a 3H synchronism portion (1H represents a period required for transmitting one horizontal line of the frame), a 2H white level portion, a 1H data portion including tramission data, a reproduction ID data, a 1H blank portion, and a (YE-6)H image portion.

The synchronism portion is inserted to indicate an end of a line in the image signal portion due to the H period (the 0th to XEth dots of one line of the memory are read out for 1H wherein the 0th to 4th dots are set at white level and the 5th to XEth dots are set at black level). The white level portion corresponds to the white level of the image portion and serves to correct changes in transmission level caused by the transmission line conditions. The period of the synchronism and white level portions may be set as long as, e.g., 10 seconds in the above-mentioned data waveform.

The transmission data in the data portion comprises data (bit 0) representing the frame or field transmission mode, data (bits 1 and 2) for identifying a transmission color mode (monochromatic, single, color, two-color, three-color and four-color modes), data (bit 3) representing the normal or single color transmission mode, a code (bits 4 and 5) representing a swith at which a color in the single color mode is set, and 2- to 6-byte information data (to be referred to as ID data hereinafter) associated with each frequency-multiplexed still image recorded in the floppy disk. Bits 1 and 2 in the single color transmission mode constitute data representing which color mode is set before the single color transmission mode is set.

The ID data includes photographing data, photographing time data, data representing frame or field recording, and data representing the even- or odd-numbered field if frame recording is performed.

The data format is determined by the following bit allocation (1st byte for transmission mode and 2nd to 6th bytes for ID data).

|          |               | Bit 0 | 0 → Field transmission mode<br>1 → Frame transmission mode | | | | |
|----------|---------------|-------|-------|-------|---------------------------------|-------|----------------|
|          |               |       | Bit 1 | Bit 2 | Bit 3                           | Bit 4 | Bit 5          |
| One Byte | Bit 1~5       |       | 0     | 0     | 0 → Monochromatic transmission mode | x     | x              |
|          |               |       | 0     | 1     | 0 → Two- color transmission mode | x     | x              |
|          |               |       | 1     | 0     | 0 → Three-color transmission mode | x     | x              |
|          |               |       | 1     | 1     | 0 → Four-color transmission mode | x     | x              |
|          | Bit 6 and 7   |       |       |       |                                 |       | Switch         |
|          | unused        |       | x     | x     | 1 → Single color transmission mode | 0     | 0 → 24         |
|          |               |       |       |       |                                 | 0     | 1 → 25         |
|          |               |       |       |       |                                 | 0     | 0 → 26         |
|          |               |       |       |       |                                 | 0     | 1 → 27         |

(Format of Transmission Data)

The format of data transmitted by the apparatus of this embodiment will be described with reference to FIG. 2.

FIG. 2 shows a still image transmission data waveform according to this embodiment. The transmission data is subject to read/write access using the color signal memories 213, 214, 215, and 250 shown in FIG. 1B. FIG. 2 shows a data waveform of one of the colors. The abscissa in FIG. 2

```
                Bit 8     ( 0 → Field recording
                          ( 1 → Frame recording
             ┌ Bit 9 . . . Field information if bit 8 represents frame recording
             │            ( 0 → Field recording
Two Bytes    │            ( 1 → Frame recording
             │ Bits
             └ 10–15 . . . Track numbers (1~50) to be paired in frame recording
               Three bytes . . . Image track number
               Four bytes . . . Photographing year (Two-digit BCD consisting of unit's
                                   place of lower four bits and ten's place of upper four
                                                                                       bits)
               Five bytes . . . Photographing month (Two-digit BCD consisting of unit's
                                   place of lower four bits and ten's place of upper four
                                                                                       bits)
               Six bytes . . . Photographing day (Two-digit BCD consisting of unit's
                                   place of lower four bits and ten's place of upper four
                                                                                       bit)
```

When the above data is to be transmitted, logic "1" represents an "FF" level and logic "0" represents a "00" level. For example, 2 dots of the plurality of dots X in FIG. 3 represent one bit.

The 1H blank portion is formatted to accurately detect the beginning of data of the image signal.

Figure 3:
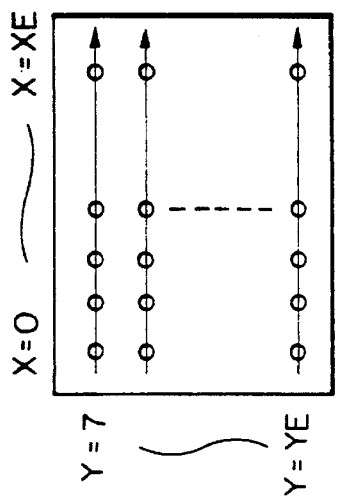

FIG. 3 is a two-dimensional data array of data in the image portion. Each of the memories 213 to 215 and 250 has the above array. Dots X=0 to XE are given in the horizontal direction, and lines Y=7 to YE excluding lines Y=0 to 7 for the synchronism, white level, data, and blank portions are given in the vertical direction. Therefore, a total number of dots of the array is (XE+1)×(YE−6).

(Operation of Embodiment)

Figure 4:
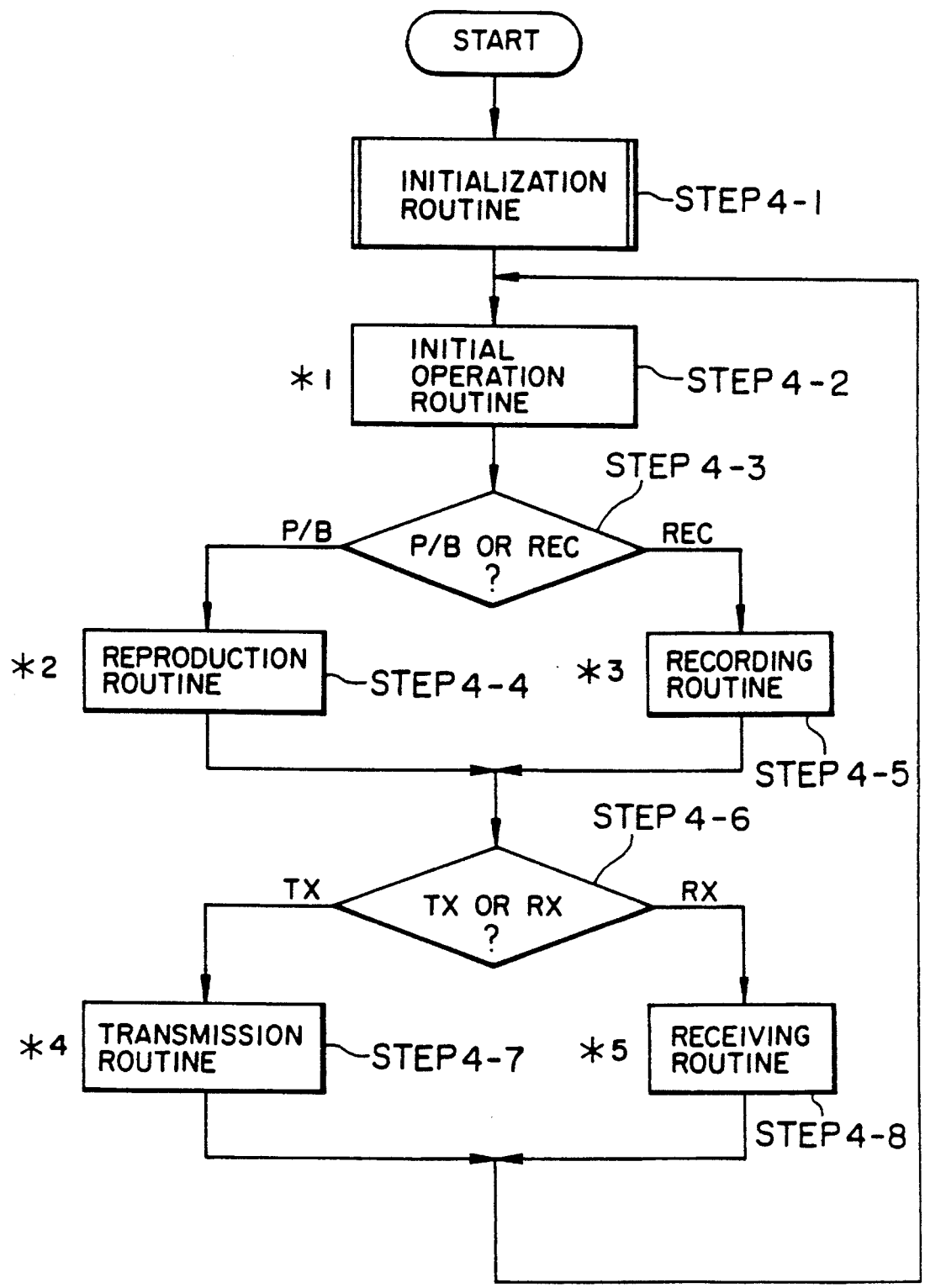
Figures 1, 5A:
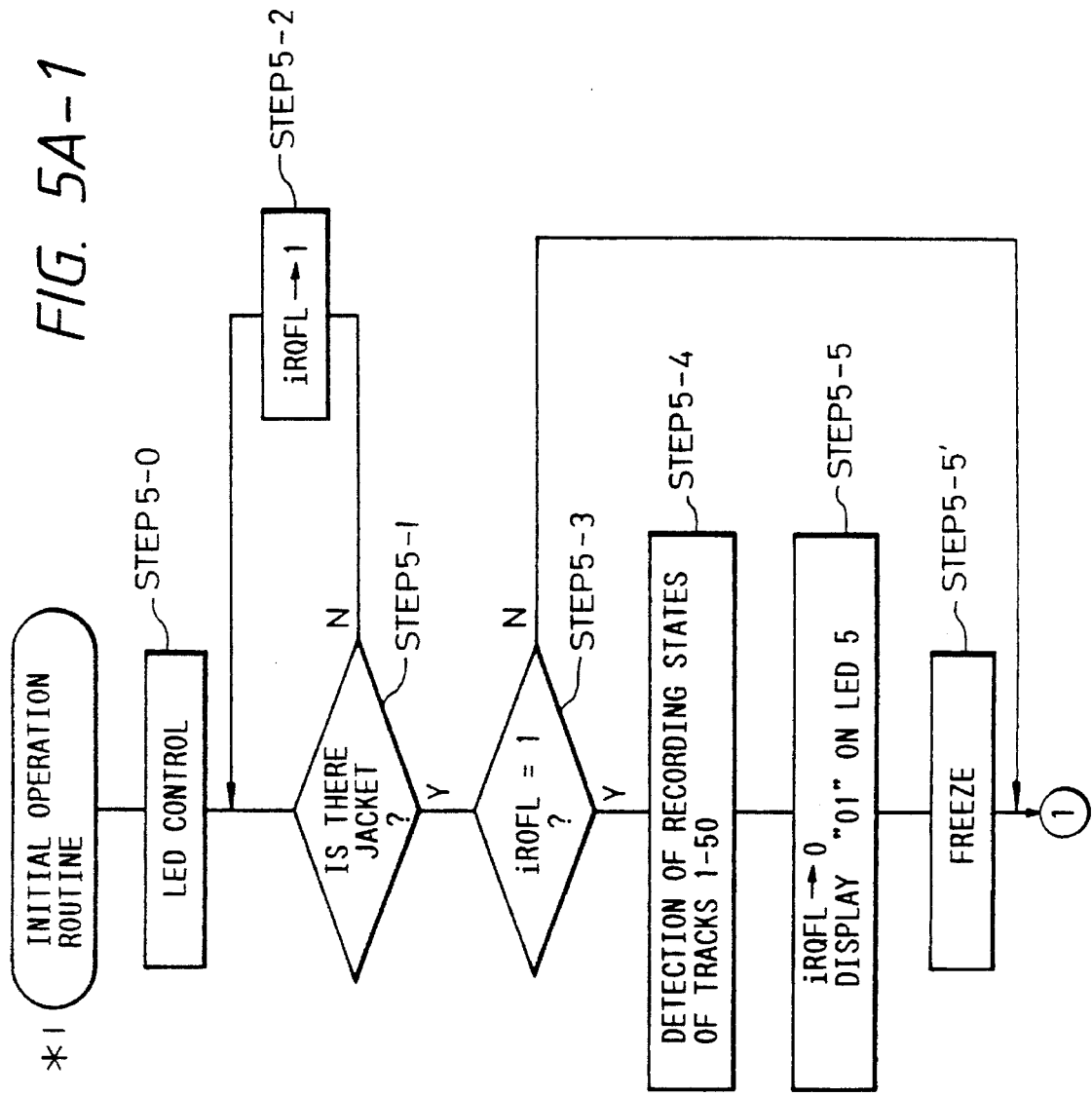
Figures 2, 5A:
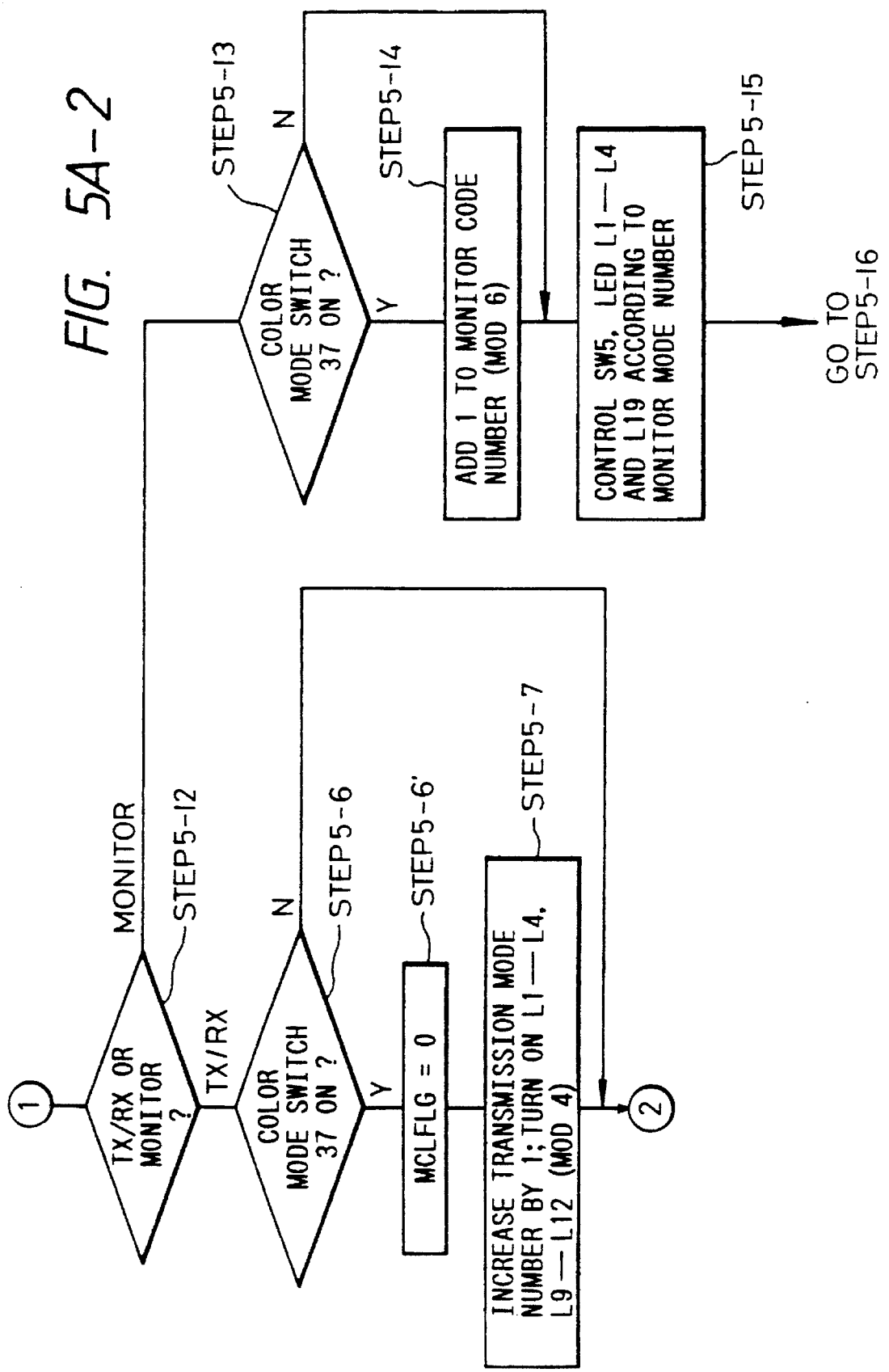
Figures 3, 5A:
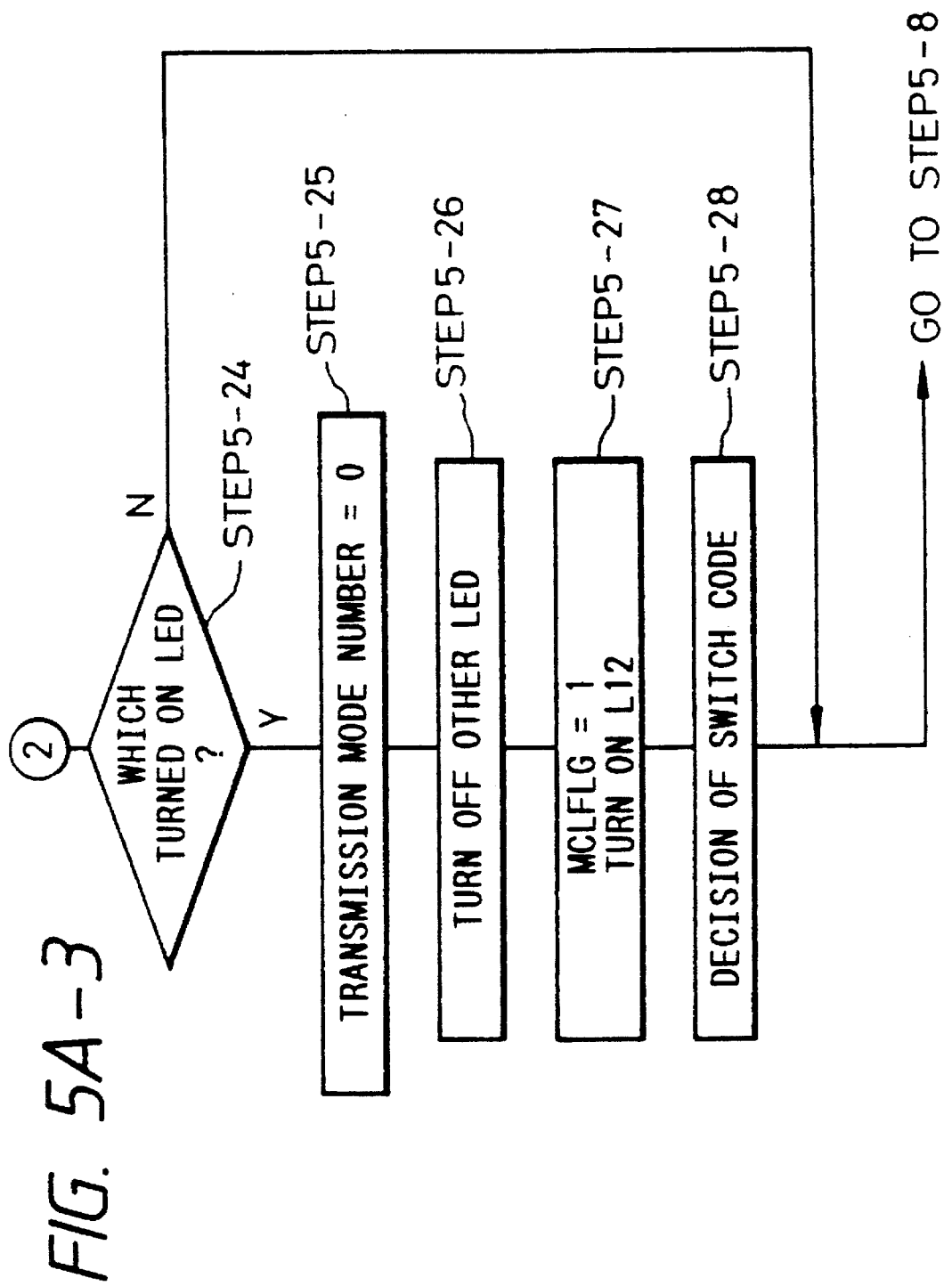
Figures 1, 5B:
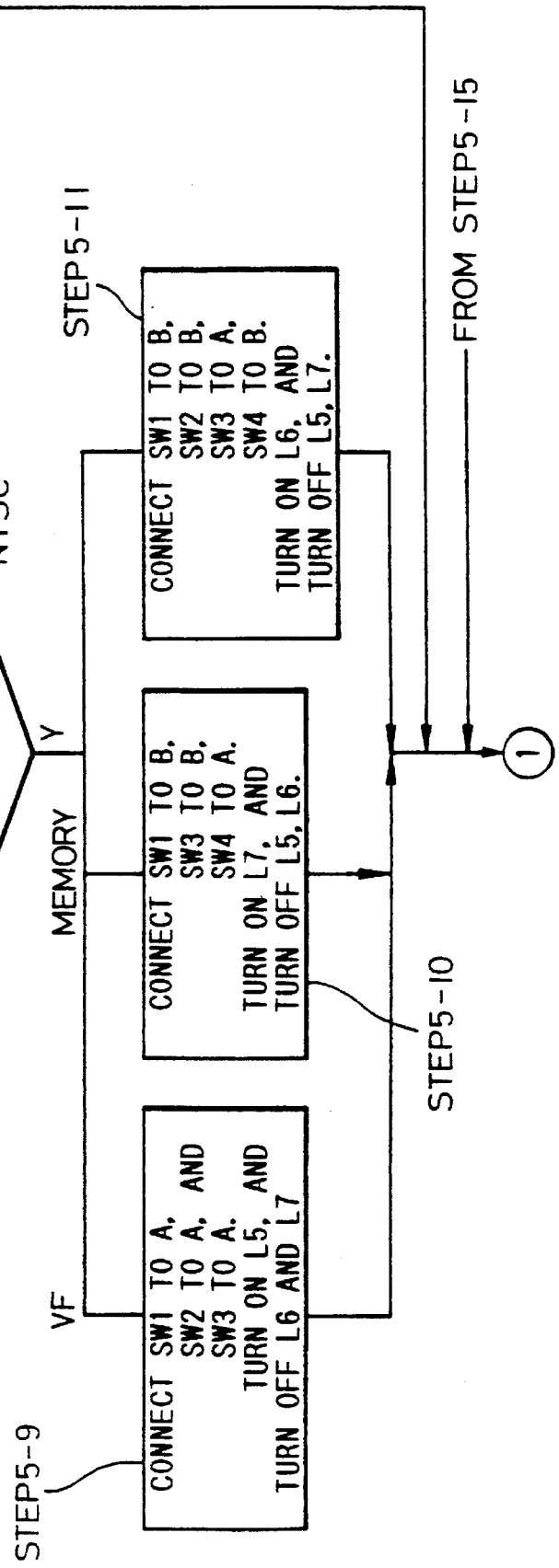
Figures 2, 5B:
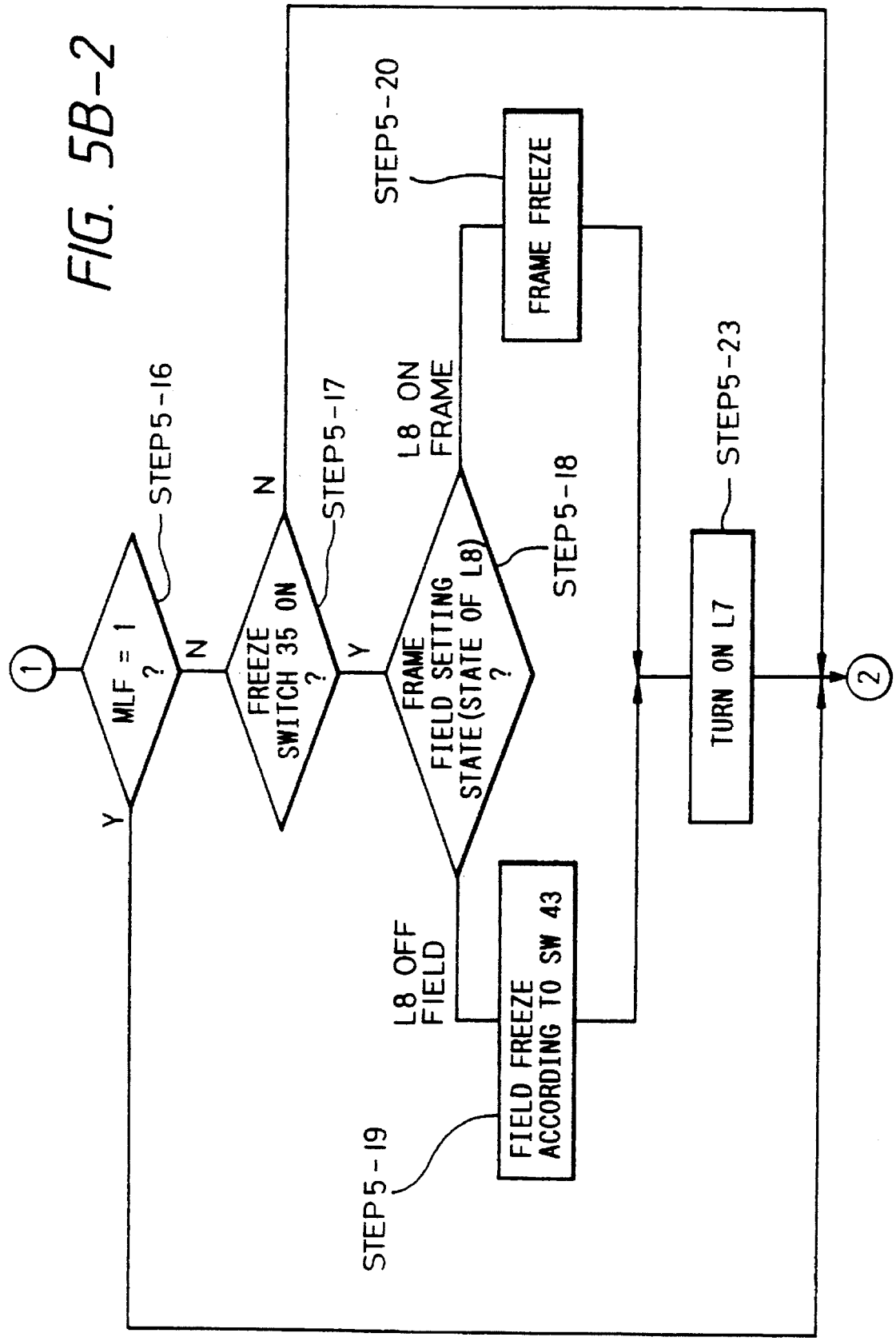

The operation of the embodiment described above will be described with reference to flow charts. FIG. 4 is a flow chart showing a basic operation of the embodiment.

(Initialization Routine)

When the power switch 1 is turned on, the control circuit 100 performs various initialization operations in step 4-1. More specifically, the control circuit 100 clears a memory lock flag MLF for determining whether memory freezing is inhibited. In this state, the image signal can be written (frozen) in the memories in FIG. 1B-2. The control circuit 100 sets an initialize request flag IRQFL for determining whether the track recordable state must be detected. In addition, the control circuit 100 sets an interrupt mask IRQMSK for inhibiting the interrupt operation to obtain a data transmission/reception timing, thereby inhibiting interrupt processing.

The transmission mode number is set to be "1", i.e., the two-color transmission mode. The transmission mode is set as the transmission/reception mode. In this state, the automatic transmission/reception mode is not set.

The memory lock flag MLF is reset and the memory lock state is cancelled.

The monitor mode number is set to be "0", i.e., the color monitor mode is set. If the function switch is set in the TX/RS position, the LEDs L1, L2, L9, and L19 are turned on. However, if the function switch is set in the MONITOR position, the LEDs L1, L2, L3, and L19 are turned off.

The reproduction mode is set in initial setting, and thus the LED L5 is turned on.

The FIELD/FRAME LED L8 is turned off, and thus the field mode is set.

When the above initialization routine is completed, the control circuit 100 performs an initial operation routine in step 4-2. When the control circuit 100 checks the recording/reproduction and transmission/reception enable state, the flow advances to step 4-3. If the control circuit 100 determines in step 4-3 that the reproduction mode is set, the flow advances to step 4-4 and thus the reproduction routine is executed. However, if the control circuit 100 determines in step 4-3 that the recording mode is set, the flow advances to step 4-5 and the recording routine is executed. This mode discrimination is performed by detecting a state of the switch SW1. More specifically, if the switch SW1 is set in the A position, the reproduction mode is set. However, if the switch SW1 is set in the B position, the recording mode is set. After the operation in step 4-4 or 4-5 is executed, the control circuit 100 determines in step 4-6 whether the RX or TX mode is set. If the control circuit 100 determines that the TX mode is set, the flow advances to step 4-7 and a transmission routine is executed. However, if the control circuit 100 determines that the RX mode is set, the flow advances to step 4-8 and a receiving routine is executed.

When the recording/reproduction routine and the transmission/receiving routine are completed, the flow returns to step 4-2. The control circuit 100 performs operations according to commands input from the switches.

(Initial Operation Routine)

The initial operation routine in step 4-2 will be described in detail with reference to FIGS. 5A, 5A-1, 5A-2, 5A-3 and FIGS. 5B-1, 5B-2, 5B-3. The LEDs shown in FIG. 1A are selectively turned on according to the states of the flags (step 5-0). The control circuit 100 determines in step 5-1 whether the magnetic sheet 201 is present, i.e., the jacket is present in response to an output from the magnetic sheet detection circuit 232. If NO in step 5-1, the initialize request flag IRQFL is set in step 5-2. The control circuit 100 waits for insertion of the magnetic sheet 201 in step 5-1. However, if YES in step 5-1, the control circuit 100 determines in step 5-3 whether the flag IRQFL is set. If YES in step 5-3, the control circuit 100 detects all output signals from the level detection circuit 208 in step 5-4. These output signals represent recording states (recorded or non-recorded) of tracks 1 to be located 50. The head 205 is controlled to locate above the first track. The resultant track recording state is stored in the control circuit 100. The recording state is changed according to a change in the recording operation or the like. When the operation in step 5-4 is completed, the flag IRQFL is reset to "0", and numerical value "1" is displayed on the 7-segment LED 5 in step 5-5.

The same operations as in the flow chart of steps 6-12 to 6-22 (to be described later) are performed to freeze the signals from the first track to in the memories 213 to 215 (step 5-5'). The control circuit 100 then detects the state of the function switch 42. More specifically, if the function switch 42 is set in the MONITOR position, the flow advances to step 5-13. However, if the function switch 42 is set in the TX/RX position, the flow advances to step 5-6.

The following routine is executed when the function switch 42 is set in the TX/RX position. In this case, when the COLOR MODE switch 37 is turned on (step 5-6), 1 is added to the transmission mode number according to a calculation of modulo 4 (step 5-7). The transmission mode numbers are defined as follows:

0: monochromatic or single color TX mode
1: two-color TX mode
2: three-color TX mode
3: four-color TX mode The LEDs L1 to L4 are selectively turned on according to the transmission mode numbers. As described above, when the power switch is turned on, the two-color transmission mode is set, and thus the mode number is 1. The relationship between the color modes and the LEDs which are turned on are given as follows:

| | |
|---|---|
| Monochromatic or single color TX mode | L4, L12, L19 |
| (L19 off in monochromatic TX mode) | |
| Two-color TX mode | L1, L2, L9, L19 |
| Three-color TX mode | L1, L2, L3, L10 L19 |
| Four-color TX mode | L1, L2, L3, L4 L11, L19 |

The ON/OFF and blinking operations of the LEDs L1 to L4 are controlled in accordance with the following sequence.

The transmission mode selection method is not only determined by the number of times of depression of the color mode switch but also by the operating states of switches integrally formed with the LEDs 38 to 41.

The control circuit 100 determines in step 5-24 which switches corresponding to the ON LEDs are turned on according to the transmission mode. Upon this detection, the corresponding transmission mode number is set to be "0" so that the single color transmission mode is set (steps 5-25 to 5-28). However, if no LEDs are turned on, the flow advances to step 5-8.

When the function switch is set in the TX/RX position, the LEDs L9 to L12 corresponding to the respective transmission modes are selectively turned on. One of the switches 24 to 27 corresponding to the ON LED (of the LEDs L1 to L4) in response to the above operation is turned on to set the single color transmission mode (step 5-25). The LEDs corresponding to the ON switches including LED L12 and LED L4 are turned on, and the remaining LEDs are kept off (steps 5-26 and 5-27). Therefore, the single color transmission mode is indicated.

A switch code SC corresponding to the set single color transmission mode is determined. The switch code SC corresponds to bits 4 and 5 of the transmission data and is defined as follows:

| Switch Code SC | Switch |
|---|---|
| 00 | 24 |
| 01 | 25 |
| 10 | 26 |

-continued

| Switch Code SC | Switch |
|---|---|
| 11 | 27 |

When one of the switches 10, 11, and 12 for selecting a source is turned on, the source to be reproduced on the monitor display 3 is selected (step 5-8).

If the VF switch 10 is depressed, all the switches SW1, SW2, and SW3 shown in FIGS. 1B-1, 1B-2 are set in the A positions, and at the same time the LED L5 is turned on (the LEDs L6 and L7 are turned off) (step 5-9) (the switch SW4 may be turned on/off).

If the MEMORY switch 12 is depressed, the switches SW1, SW3, and SW4 are respectively set at the B, B, and A positions shown in FIGS. 1B-1, 1B-2 and at the same time the LED L7 is turned on (the LEDs L5 and L6 are turned off) in step 5-10 (the switch SW4 may be turned on/off). The image signals read out from the memories 213, 214, and 215 can be reproduced on the monitor display 3 during transmission of the memory information since the access speed of the memory controller 223 is very high.

If the NTSC switch 11 for designating an external NTSC input is turned on, the switches SW1, SW2, SW3, SW4 in FIGS. 1B-1, 1B-2 are respectively set in the B, B, A, and B positions, and at the same time the LED L6 is turned on (in this case, the LEDs L5 and L7 are turned off) in step 5-11. When the external input or memories are selected as described above, the switch SW1 is set in the B position, and thus the recording mode can be automatically set. Immediately prior to the operations of the switches, the control circuit 100 discriminates and an output from the level detection circuit 208 to determine whether recording can be performed.

If the control circuit 100 determines in step 5-12 that the function key 42 is set in the MONITOR position, the routine in step 5-13 and the subsequent steps is executed. In the same manner as described in steps 5-6 and 5-7, the monitor mode number is incremented by one according to a calculation of modulo 6 whenever the COLOR MODE switch 37 is turned on in steps 5-13 and 5-14. A color to be displayed on the monitor display 3 is determined according to the monitor mode number. ON/OFF operations of the switch SW5 and the LEDs L1 to L4 and L19 are controlled according to the set mode (step 5-15). The control sequences in the modes are determined as follows:

| Monitor Mode | Memory Controlled by SW5 and Outputting to D/A Converters 216–218 | Operation of Color Killer Circuit 256 | ON LED |
|---|---|---|---|
| 0 | Memories 213–215 | Disabled | L1, L2, L3, L19 |
| 1 | R memory 213 | Enabled | L1, L19 |
| 2 | G memory 214 | Enabled | L2, L19 |
| 3 | B memory 215 | Enabled | L3, L19 |
| 4 | Bk memory 250 | Enabled | L4, L19 |
| 5 | Memories 213–215 | Enabled | L4 |

When the single color monitor mode is set, i.e., when one of the memories 213 to 215 and 250 is read-accessed and the readout signals are reproduced on the monitor display 3, the output from the selected memory is selectively output to the D/A converters 216 to 218. Therefore, the output from the memory can be reproduced as a luminance signal, i.e., a monochromatic signal on the monitor display 3.

In the above embodiment, the monitor mode is selected upon operation of the switch 37. However, the operating states of the switches 24 to 27 may be discriminated to select a proper mode.

If the memory lock flag is set at logic "0" (step 5-16), the control circuit 100 determines in step 5-17 whether an input is entered from the FREEZE switch 37. If YES in step 5-17, the freezing routine in step 5-18 and the subsequent steps is executed. The control circuit 100 determines in step 5-18 according to the ON/OFF state of the LED 18 whether the frame or field mode is set. If the control circuit 100 determines that the field mode is set, the image signal is frozen in the memory corresponding to the state of the switch 43 in step 5-19 (the image signal of field 1 is frozen in the odd-numbered line in the frame memory and the image signal of field 2 is frozen in the even-numbered line therein). However, if the control circuit 100 determines that the frame mode is set, the identical image signal is written in the odd- and even-numbered lines of the frame memory in step 5-20. In step 5-23, the LED L17 is turned on.

The control circuit 100 determines in step 5-21 whether the FRAME/FIELD switch 28 is depressed. If YES in step 5-21, the operating state of the LED L8 is inverted in step 5-22.

(Reproduction Routine)

Figure 6C:
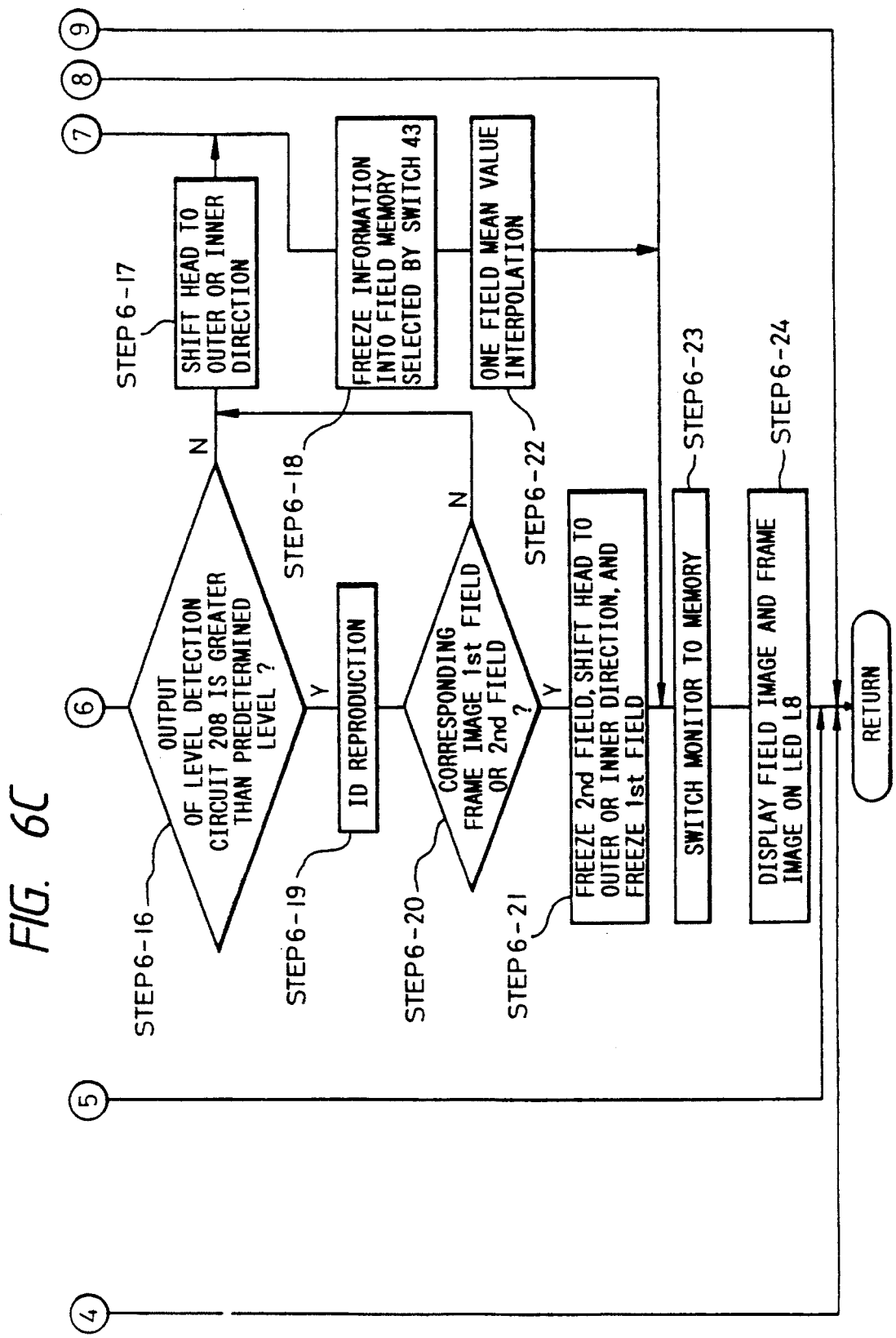

FIGS. 6A, 6B and 6C comprise a detailed flow chart showing the reproduction routine. When the control circuit 100 determines in step 6-1 that the memory lock button is depressed, the logic level of the memory lock flag MLF is inverted (steps 6-2, 6-3, and 6-4).

The control circuit 100 determines in step 6-5 whether the track UP or DOWN switch is operated. If the control circuit 100 determines that the track UP switch is operated, the flow advances to step 6-6. However, if the control circuit 100 determines that the track DOWN switch is operated, the flow advances to step 6-8. The control circuit 100 determines in step 6-6 whether the track number currently accessed by the head 205 is less than 50. If YES in step 6-6, the head is driven in a direction (inward) where the track number is increased in step 6-7. The control circuit determines in step 6-8 whether the currently accessed track number is larger than 1. If YES in step 6-8, the head is driven in a direction (outward) where the track number is decreased in step 6-9. In steps 6-7 and 6-9, the current track numbers are displayed on the 7-segment LED 5.

When track traveling is completed, the monitor display 3 is switched to the SV reproduction side in step 6-10 in the same manner as in step 5-9. If the memory lock flag MLF is set at logic "0" (step 6-11), the control circuit 100 determines in step 6-12 whether the output from the level detection circuit 208 exceeds a predetermined level, If YES in step 6-12, the flow advances to the operations in step 6-13 and the subsequent steps. However, if NO in step 6-12, the memories 213, 214, 215, and 250 are erased (i.e., the contents are replaced with the black level) (step 6-25).

If necessary, the reproduction head which currently contacts the magnetic sheet may be separated therefrom, and the signal reproduction system may be disabled.

If the control circuit 100 determines in step 6-12 that the output from the level detection circuit 208 exceeds the predetermined level, the ID signal frequency-superposed on the image signal is demodulated by the ID detection circuit 251, thereby reproducing the ID data (step 6-13). The control circuit 100 determines in step 6-14 whether the reproduced image data is an odd- or even-numbered field on the basis of the ID data. If the image signal is determined to be field data, the signal is written in the field designated by the switch 43 of the R, G, B frame memories, e.g., in an odd-numbered line if field 1 is designated and an even-numbered line if field 2 is designated (step 6-18). The image signal is determined in step 6-14 to be one of the field or the frame, the head is moved by one track in the inner direction if the field is discriminated as the first field (step 6-15). However, if the field is discriminated as the second field, the head is moved by one track in the outer direction (step 6-15). This is because the image signals can be frozen in units of tracks since a single reproduction head is used. If an apparatus comprises a multi-head (Inline head), such head traveling is not required. If frame recording is to be performed, an odd-numbered field signal may be recorded in a track having a smaller track number, and an even-numbered field signal may be recorded in an adjacent track having a larger track number. When head traveling in step 6-15 is completed, the control circuit 100 detects the output from the level detection circuit 208 (step 6-16). If the level of the output from the level detection circuit 208 exceeds a predetermined level, the ID data is reproduced (step 6-19). The control circuit 100 determines in step 6-20 whether the currently reproduced field signal is paired with the field signal reproduced in step 6-15. If YES in step 6-20, the image signal reproduced by the head 205 is frozen at the address corresponding to the field, the head is returned to the home track position, and the above-mentioned field signal is frozen again (step 6-21).

If only one field of the image signals constituting the frame is recorded in steps 6-10 and 6-20, the reproduction head is returned to the home track position (step 6-17), and the other field is obtained by mean value interpolation of the upper and lower lines in a non-frozen area of the frame memory, thereby freezing the interpolated information (step 6-18) and hence obtaining frame data (step 6-22). As compared with framing wherein an input in step 6-20 is an SV reproduced image, a high-quality frame image can be obtained.

At this point, freezing in the frame or field mode of the reproduced image signal has been performed, and the switch is operated to supply the memory reproduced signals to the monitor display. More particularly, the same operation as in step 5-10 is performed in step 6-23. The frame or field of the reproduced image is displayed using the LED L8 on the basis of the ID data reproduced in step 6-24. In this case, if the image signal to be frozen is the frame image signal, the LED L8 is turned on. Otherwise, the LED L8 is turned off.

(Recording Routine)

The recording routine in step 4-5 in FIG. 4 will be described in detail with reference to FIG. 7.

Figure 7:
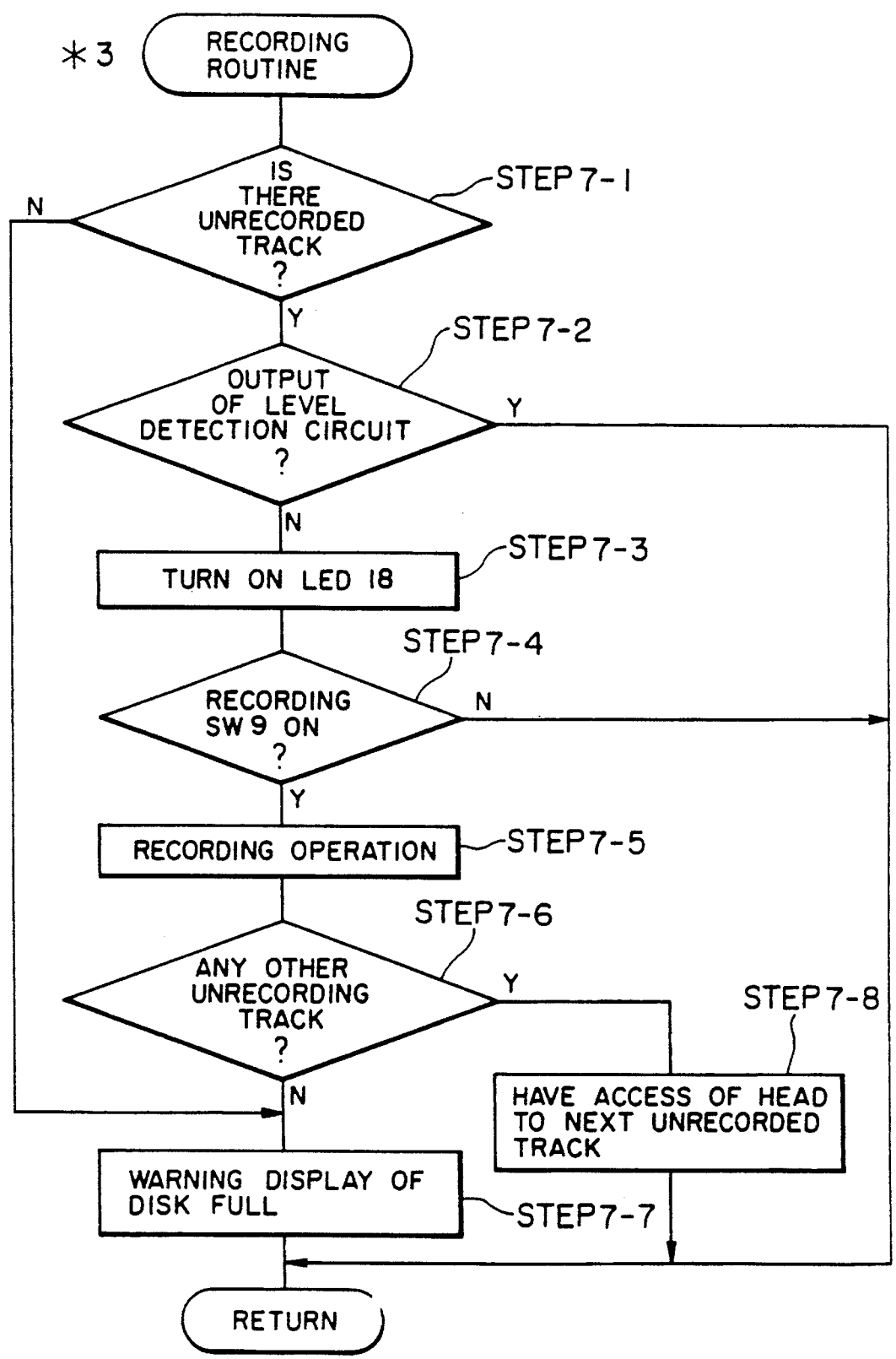

FIG. 7 is a flow chart of the recording routine. When the control circuit 100 detects in step 4-3 that the switch SW1 is set in the B position, i.e., the control circuit 100 detects that the switches 11 and 12 are turned on, the recording routine is initiated.

The presence or absence of unrecorded or blank tracks of the magnetic sheet 201 is detected in step 7-1. If unrecorded tracks are not present, "FF" is displayed on the 7-segment LED 5, thus performing warning display (step 7-7). However, if unrecorded tracks are present, the output of the level detection circuit is checked (step 7-2) and the LED L18 is turned on (step 7-3), thus indicating that recording can be performed. In this step, the switch SW1 is temporarily set in the A position.

When the recording switch SW9 is depressed while the LED L18 is being turned on (step 7-4), a recording operation of a memory or NTSC external source excluding the video floppy disks set in steps 5-10 and 5-11 is performed on the magnetic sheet 201 (step 7-5). If other unrecorded tracks are not present (step 7-6), recording can no longer be performed and the warning display of "disc full" is performed (step 7-7). If unrecorded tracks are present, the head is automatically accessed to the next unrecorded track (step 7-8).

(TX Routine)

The TX routine in step 4-7 in FIG. 4 will be described in detail with reference to FIGS. 8A, 8B and 8C comprise a detailed flow chart of the TX routine. In this embodiment, track feeding is performed even during transmission/reception by using an interrupt command. Therefore, the image reproduced from the magnetic sheet can be observed on the monitor display.

The LED L14 is turned on and the LED L15 is turned off to set the transmission mode in step 8-0. The control circuit 100 determines in step 8-1 whether the auto TX mode is set. If the control circuit 100 determines that the manual mode is set, the LED L17 is turned off in step 8-2'. If the auto TX mode is set, the LED L17 is turned on in step 8-7'.

The manual mode will first be described.

When the START switch 32 is depressed (step 8-2), the memory lock flag MLF is set (step 8-3) in order to prevent reproduction auto freezing of the frozen still image information. The address (X,Y) of the transmission data is reset to (0,0) (step 8-4), and the flag TXFLG representing that the information is being transmitted is set (step 8-5). The interrupt mask is reset to zero, and thus the interrupt command generated for every data interval can be accepted. Transmission is initiated in response to the next output of the interrupt counter 253. A variable j representing the order of the transmission mode color determined by the transmission mode number is reset to an initial value, i.e., 0 (step 8-6').

Figure 11:
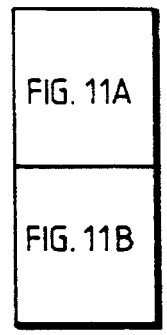

In the auto TX mode, the control circuit 100 checks in step 8-7 the status of the flag ATXFLG representing whether the auto TX mode is set. If the auto TX mode is set, the flow advances to the next step. The flag ATXFLG is set to be logic "1" when the track number to be transmitted is set by the track number setting circuit 255 shown in FIG. 1B prior to actual transmission. However, if the flag ATXFLG is set to be logic "0", the auto TX mode cannot be set and the flow advances to the track number setting routine in step 8-24 (a detail thereof is shown in FIG. 11).

(Track Number Setting Routine)

Figure 11A:
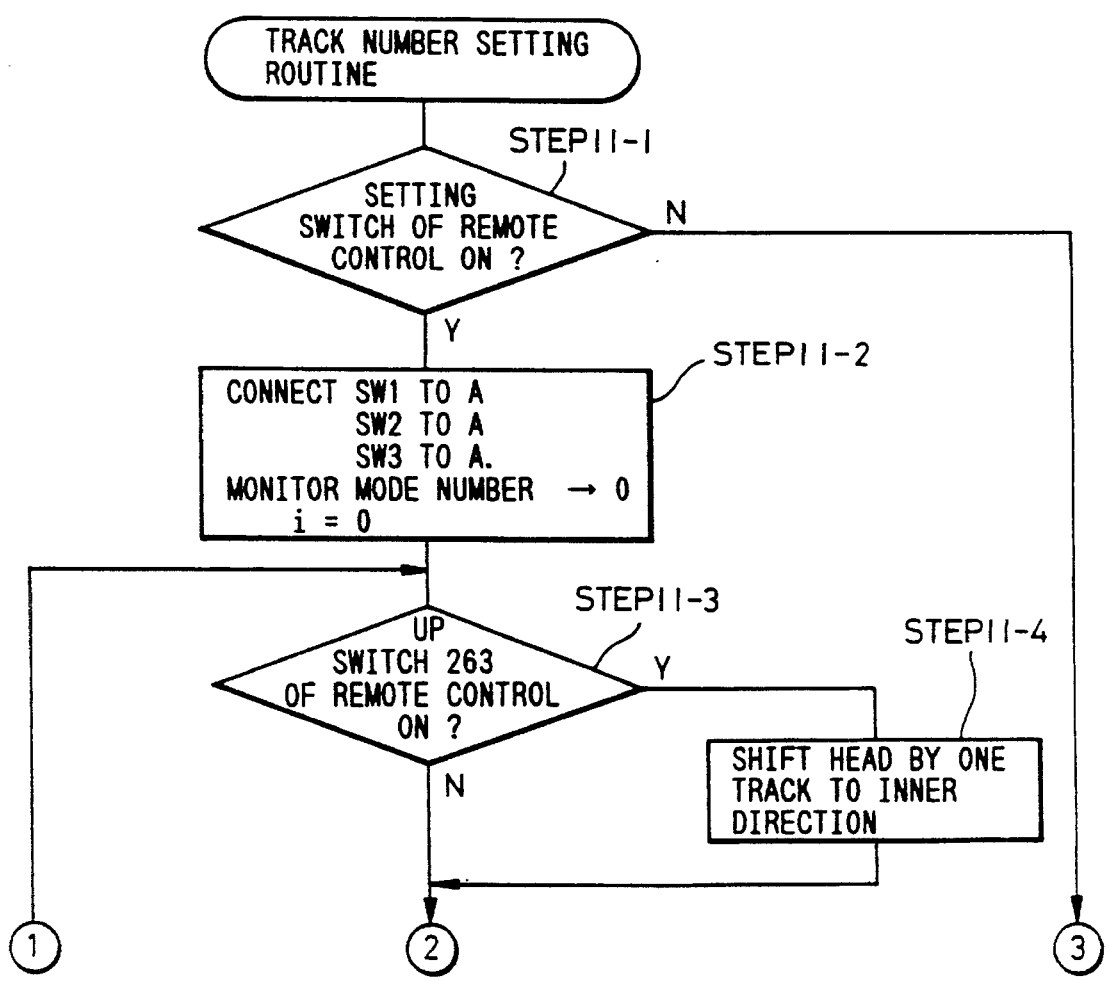
Figure 11B:
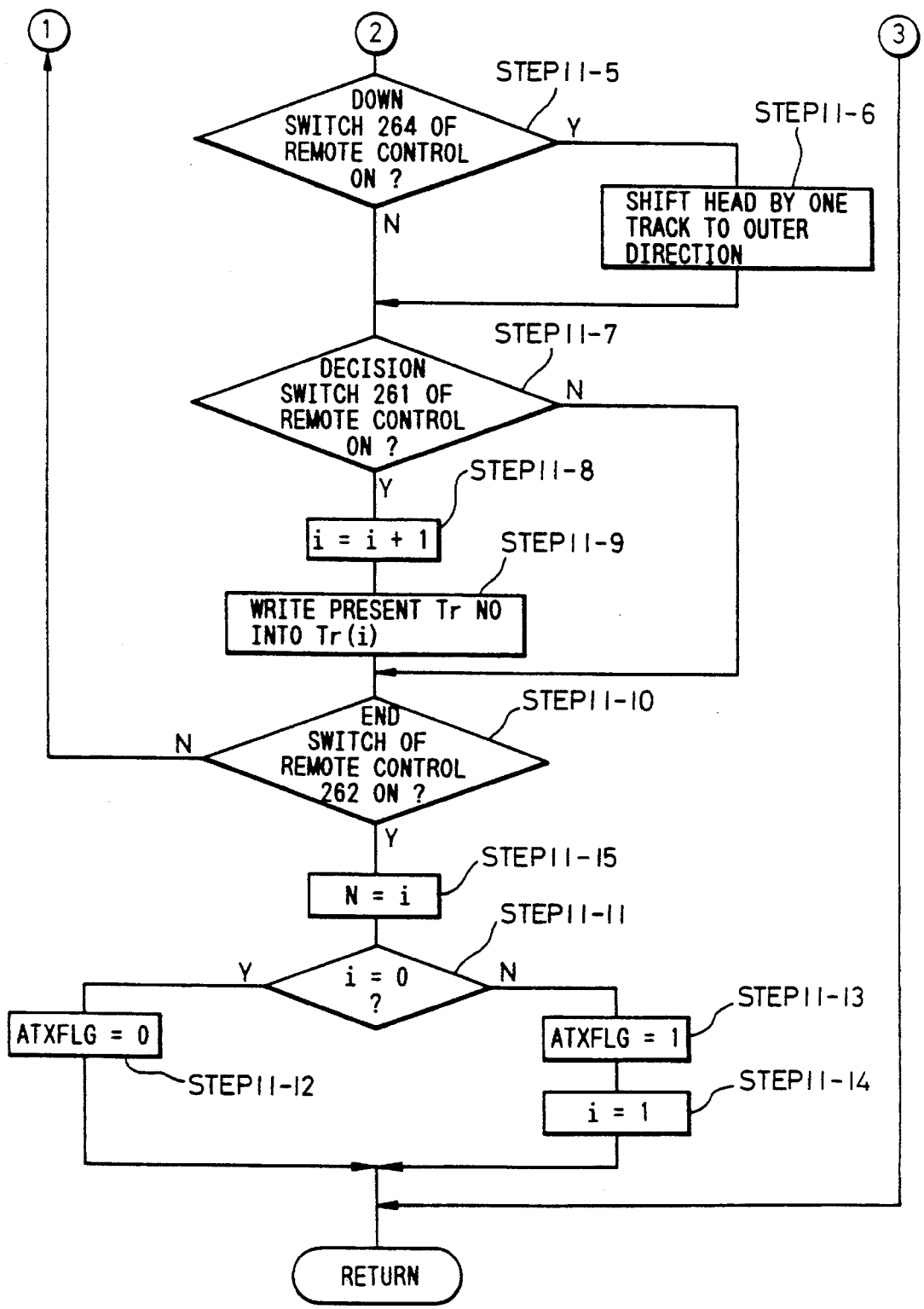

The track number setting routine executed in step 8-24 will be described in detail with reference to FIGS. 11A and 11B. FIGS. 11A and 11B comprise a detailed flow chart of the track number setting routine.

When the switch 260 in the track number setting circuit 255 of the remote control is depressed once (step 11-1), the set image number i is cleared to 0. At the same time, the same state as in the ON operation of the VF switch 10, i.e., the reproduction mode is set. The monitor mode number is also set to be 0 (step 11-2). The control circuit 100 detects in step 11-3 whether the track UP switch 263 in a remote control 255 is depressed. If YES in step 11-3, the head is shifted by one track to the inner direction (step 11-4). The control circuit 100 detects in step 11-5 whether the track DOWN switch 264 is depressed in the remote control. If YES in step 11-5, the head 205 is shifted by one track to the outer direction (step 11-6).

Input operations of the UP and DOWN switches 263 and 264 may be replaced with the operations of the UP and DOWN switches 19 and 20 on the main body.

The control circuit 100 then determines in step 11-7 whether the switch 261 for inputting the track number in the remote control is depressed. If YES in step 11-7, a variable i is incremented (step 11-8). The track number of the track presently accessed by the head 205 is stored as Tr(i) in the memory of the main body (step 11-9).

The loop of steps 11-3 to 11-9 is repeated until the end switch 262 is depressed to complete the track number input in the remote control, and the track number input operation is not ended (step 11-10).

When the end switch 262 is turned on, the value of the variable i is input to a register N (step 11-15) and the number N of still images to be automatically transmitted is substituted for i (step 11-15). The control circuit 100 determines in step 11-11 whether i is zero. If YES in step 11-11, the track number has not yet been set. The flag ATXFLG is reset to zero so as to cause auto TX setting (step 11-12). However, if NO in step 11-11, the track number is set to be 1 or more. In this case, the flag ATXFLG is set to be 1 (step 11-13) and i=1 is set (step 11-14).

(Auto TX Routine)

Figure 8B:
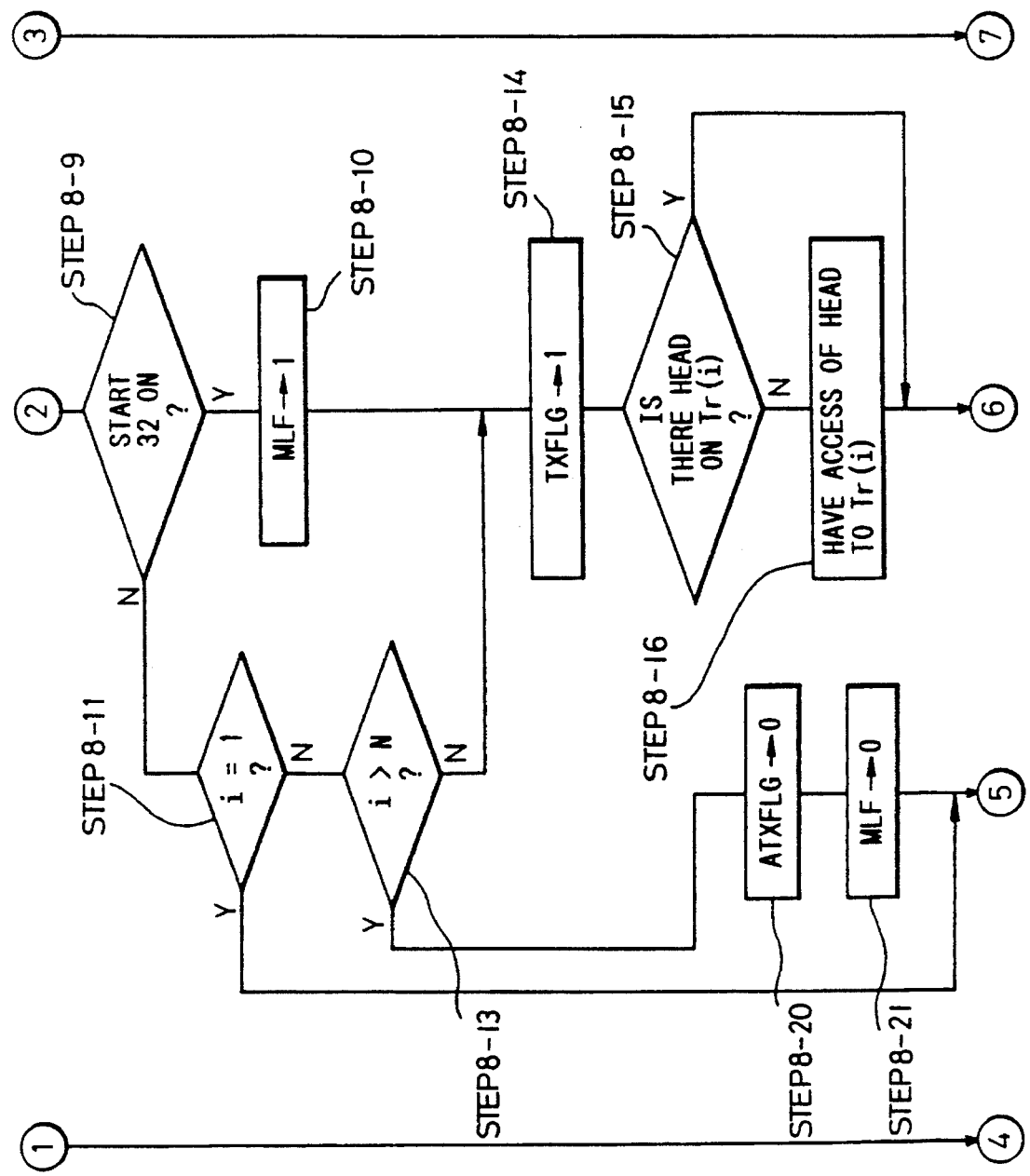

When the track to be automatically transmitted is set in the manner as described above, the flow advances to step 8-22 shown in FIGS. 8A, 8B and 8C and the subsequent steps are executed.

In step 8-8 executed when the flag ATXFLG is set, the control circuit 100 determines that the flag TXFLG representing that the information is being transmitted is set to be "1". If the control circuit 100 determines that TXFLG=1, the subsequent steps are omitted. Otherwise, the control circuit 100 determines in step 8-9 whether the START switch 32 is turned on. When the START switch 32 is depressed, the memory lock flag MLF is set to inhibit automatic freezing, thereby preventing accidental updating of the transmission data (step 8-10).

However, if the START switch 32 is not turned on, the control circuit 100 checks if the variable i is set to be "1". If so, the flow advances to step 8-22. Otherwise, the flow advances to step 8-13.

If i is larger than N, i.e., if the value is incremented upon detection of one-frame image signal transmission in an interrupt routine (to be described later) (see step 10-54 to be described later), the flow advances from step 8-11 to step 8-13. The control circuit 100 determines in step 8-13 whether the variable i is larger than the value set in the register N, i.e., the number of frames to be transmitted and set in the track number setting routine step 8-24 has already been transmitted. If YES in step 8-13, the flow advances to step 8-20. Otherwise, the flow advances to step 8-14.

In step 8-20, the flag ATXFLG is reset to be "0" so as not to set the auto TX mode, and the memory lock flag MLF is reset to be "0", thus cancelling the transmission state. In this case, the flag TXFLG is also reset to be "0".

If the control circuit 100 determines in step 8-13 that the information is being transmitted, the flag TXFLG is set to be "1" (step 8-14). The track number Tr(i) corresponding to the value stored in the track number setting routine is read out according to the value of the variable i, and the control circuit 100 determines in step 8-15 whether the head is located above the corresponding track Tr(i). If not, the head is accessed to the track Tr(i) (step 8-16), and the reproduced image signal is frozen in the memory (step 8-17). Subsequently, the address (X,Y) is reset to (0,0) in the same manner as in the manual transmission mode (step 8-18). The interrupt mask IRQMSK is reset to be "0". In this state, the interrupt command can be accepted, and the interrupt routine shown in FIG. 1 can be executed (step 8-19). The variable j is reset in the same manner as in step 8-6' (step 8-19').

When the transmission routine described above has been completed, the following steps are executed to cause the LEDs described with reference to FIG. 1A to blink according to the transmission color.

The control circuit 100 determines in step 8-22 whether the flag TXFLG is set. If YES in step 8-22, the LED (transmission mode number, j) corresponding to the color of the presently transmitted image blinks (step 8-23).

The blinking LEDs corresponding to the transmission mode number and the variable j are as follows:

| (TX Mode No., j) | | Blinking LED |
|---|---|---|
| (0 (monochrome), | 0) | L4 (Y) |
| (1 (two-color), | 0) | L1 (G) |
| (1, | 1) | L2 (R/B) |
| (2, | 0) | L1 (R) |
| (2, | 1) | L2 (G) |
| (2, | 2) | L3 (B) |
| (3, | 0) | L1 (R) |
| (3, | 1) | L2 (G) |
| (3, | 2) | L3 (B) |
| (3, | 3) | L4 (Bk) |

In the single color transmission mode, the LED corresponding to the switch code SC blinks.

Even if these LEDs blink, the remaining LEDs selected in step 5-7 are continuously lit to indicate the progression of transmission.

(Receiving Routine)

The receiving routine will be described in detail with reference to FIGS. 9A, 9B, 9C and 9D. The control circuit 100 determines in step 9-1 whether the auto RX mode is set by the AUTO RX REC switch 8. If YES in step 9-1, the flow advances to step 9-14. However, if NO in step 9-1, the flow advances to step 9-2.

If the auto RX mode is not set but the manual RX mode is set, the synchronism portion (step 9-3) and the white portion (step 9-4) are detected upon depression of the start button in step 9-2. The white portion is detected and at the same time the gain can be controlled (step 9-5). Subsequently, the data portion is read to fetch the ID data (step 9-6). If the white or synchronism portion is not detected in step 9-3 or 9-4 although a predetermined period of time has elapsed, the flow advances to step 9-39. When the blank portion is detected (step 9-7), the memory lock flag MLF is set to inhibit memory freezing in the reproduction mode of the video floppy disk (step 9-8), and the data address (X,Y) is initialized to (0,7) (step 9-9). This corresponds to the fact that the image portion starts from Y address 7 shown in FIG. 3. The flag RXFLG is set (step 9-10), the interrupt counter is reset (step 9-11), and the interrupt mask IRQMSK is reset (step 9-12). This allows fetching of the image data input from the signal line upon the next interrupt operation. The variable j representing the order of the present color in the transmission color mode is reset for the first color, i.e., j=0 (step 9-13).

The auto RX mode in step 9-14 and the subsequent steps will be described below. In the auto RX mode, the control circuit 100 determines in step 9-14 whether any unrecorded track is present in the magnetic disk. If NO in step 9-14, warning display of "FF" is performed on the 7-segment LED 5 in the same manner as described above (step 9-36). In this case, the auto RX mode is not set. However, if YES in step 9-14, the control circuit 100 then determines in step 9-15 whether the head is located above the first unrecorded track. If NO in step 9-15, the head is accessed to the corresponding position and a recording preparation is completed (step 9-16). In this state, the number of remaining unrecorded (recordable) tracks is displayed on the 7-segment LED 5 (step 9-17).

The contorl circuit 100 then determines whether the image information is being received. More specifically, if the flag RXFLG is set at logic "0", i.e., if the non-receiving state is detected, the flow jumps to step 9-3 and the synchronism portion is detected. If no synchronism portion appears even when a predetermined period of time has elapsed, the routine is ended.

However, if the control circuit 100 determines in step 9-18 that the image information is being received, the data portion (i.e., the transmission data and the ID data) has already been read in step 9-6. In this case, the flow advances to step 9-20.

If the data portion (FIG. 2) has already been read and the data representing the frame TX mode is detected (step 9-20), a two-field area (i.e., two unrecorded tracks) is required to record the received image signal on the magnetic sheet 201. The control circuit 100 then determines in step 9-21 whether two or more unrecorded tracks are present. If the field TX mode and the presence of two or more unrecorded tracks are detected in step 9-20 and 9-21, the flow advances to the routine in step 9-27 and the subsequent steps.

The above decision can be made since data representing the field or frame TX mode is sent prior to the image signal, as shown in FIG. 2.

If the flow advances to step 9-21, two or more unrecorded tracks are not present (i.e., only one unrecorded track is present because the presence of the unrecorded track has already been detected in step 9-14; therefore, in this case, only one unrecorded track is present), and the frame RX mode cannot be performed due to a shortage of unrecorded tracks. In this embodiment, however, bit 8 of the ID data included in the data portion (FIG. 2) is detected to determine whether the image data reproduced from the magnetic sheet 201 of the transmission side is the image signal obtained by field recording or frame recording, and the flow advances to step 9-36 if the discrimination result represents that the image signal is obtained by frame recording. In step 9-36, warning display of recording inhibition is performed. However, if the frame image signal is sent by interpolating the field signals (step 6-22 in FIG. 6C) on the transmission side, the frame image signal is recorded as the field image signal on one track.

The above sequence can be performed because the ID data is sent prior to the image signal. Therefore, it is very effective to send the ID data prior to the image signal.

The operations in step 9-22 and the subsequent steps will be described below.

In step 9-22, bit 8 of the ID data is checked to determine whether the image signal is obtained by frame recording. If YES in step 9-22, a warning display is performed beforehand (step 9-36), as described above. Meanwhile, the reception operation continues by the interrupt operation. Upon completion of the image signal, the presently loaded jacket having only one unrecorded track can be replaced with another jacket having at least two unrecorded tracks until the next reception is accepted.

If the control circuit 100 determines in step 9-22 that the image signal is obtained by field recording, the control circuit 100 determines in step 9-23 whether the line number being presently received is larger than j="TX mode number", i.e., the YC line number of the last one-frame data. In this case, the value YC can be determined to provide a period long enough to stabilize rotation control of the motor drive circuit upon rotation of the magnetic sheet 201 until the last line YE is received. If the condition is satisfied in step 9-23, the motor drive circuit drives the magnetic sheet 201 (step 9-24). Upon completion of reception (step 9-25), a one-field component in one frame, i.e., the image signals of every other line, read out from the memories 213, 214, and 215. The flow then advances to step 9-32.

If two or more unrecorded tracks are present regardless of the fact that the received signal is a field or frame transmission signal, the flow does not advance to step 9-27. The same sequence as in steps 9-23 to 9-25 is performed in steps 9-27 to 9-29.

In accordance with whether the reception mode corresponds to field or frame transmission, the flow is branched into steps 9-31 and 9-32 and steps 9-33 and 9-34 (step 9-30). If the field TX mode is set, the image signals of every other line are read out from the memories 213, 214, 215, and 250 until reception is completed (even in the field TX mode, the signals subjected to real-time interpolation processing are prestored in the memories 213 to 215 and 250 under the control of the memory controller 223). The image signal is recorded on one track (step 9-31). In this case, the ID signal may be frequency-multiplexed with the image signal.

When recording is completed, the number of unrecorded tracks is decremented by one. In this case, step 9-26 also merges into step 9-32. The number of remaining unrecorded tracks is displayed on the 7-segment LED 5 shown in FIG. 1A (step 9-32).

When reception is made in accordance with the frame TX mode, the two fields are respectively recorded on the tracks (step 9-33). In this embodiment, since only one head 205 is used, the operations in step 9-33 are performed as follows. The image signals of the first field are read out from the memories 213 to 215 and 250 and are recorded on the first track. Subsequently, the head is shifted to the second unrecorded track, and the image signals of the second field are accessed from the memories and recorded on the second track. However, in an apparatus having an in-line head, the image signals of the two fields are read out from the memories 213 to 215 and 250 on the different tracks without shifting the head.

When recording is completed, the number of remaining unrecorded tracks is decremented by 2 (step 9-34), and rotation of the magnetic sheet 201 is stopped (step 9-35). This operation reduces wear of the head and the magnetic sheet as well as power consumption. Since reception is completed, the flag FXFLG is reset (step 9-37). The control circuit 100 checks in step 9-38 whether the number of remaining blank tracks is zero. If YES in step 9-38, further recording cannot be performed. The flow advances to step 9-36 to perform warning display.

When the flag RXFLG is reset to complete an image signal recording cycle, the flow advances from step 9-18 to step 9-3 so as to execute the operations in steps 9-1 to 9-18. The operations in step 9-3 and the subsequent steps are performed. Therefore, the flow is jumped from step 9-3 to step 9-39 until the synchronism portion is detected.

When the receiving routine is completed, the subsequent steps are executed to cause the LEDs in FIG. 1A to blink.

The control circuit 100 determines in step 9-39 whether the flag RXFLG is reset. If YES in step 9-39, the LED (transmission mode number, J) corresponding to the currently received color blinks (step 9-40). The LED that corresponds to the transmission mode number and j has been described in step 8-23 in FIG. 8, and a detailed description thereof will be omitted.

Even if the LED blinks in the same manner as in transmission, the lit LEDs representing the transmission mode (a monochromatic or single color transmission mode, a two-color transmission mode, a three-color transmission mode, or a four-color transmission mode) selected in step 6-7 in FIG. 5 and the lit LEDs corresponding to the colors to be received are kept on.

For example, if the three-color transmission mode is set, the LED L10 is turned on. While the signals to be written in the R memory 213 are being received, the LED L1 blinks and the LEDs L2 and L3 are kept on. While the signals to be written in the G memory 214 are being received, the LED L2 blinks and the LEDs L1 and L3 are turned on. While the signals to be written in the B memory 215 are being received, the LED L3 blinks and the LEDs L1 and L2 are turned on. Therefore, the operator can visually recognize the receiving state.

(Interrupt Routine)

The interrupt routine for transmitting and receiving the image signal data will be described with reference to FIGS. 10A-1, 10A-2, 10-3, and FIGS. 10B-1, 10B-2, 10B-3, and 10B-4. The control circuit 100 determines in step 10-1 whether the STOP switch 33 is turned on. If YES in step 10-1, the flag RXFLG or TXFLG is reset to cancel transmission or reception (step 10-2). The flag IRQMSK is set to inhibit the interrupt operation (step 10-3) and the flag MLF is reset to cancel memory locking (step 10-4). If the stop input is not detected in step 10-1, the interrupt routine is branched into step 10-6 and the subsequent steps or step 10-38 and the subsequent steps in accordance with detection representing that the mode is the transmission or reception mode (step 10-5).

If TXFLG=1, i.e., if the transmission mode is set, the number Y of vertical lines is checked in step 10-6. If the number y falls within the range between 0 and 2, i.e., the synchronism portion is detected (FIG. 2), the synchronism pattern is created on the basis of the horizontal address X in step 10-7 and the subsequent steps. If the address X falls within the range between 0 and 4, the address corresponds to the high level portion of the synchronism portion. Output data $D(X,Y)$ is set to be "FF"$_{hex}$ (the maximum level 255 represented by 8-bit data) (step 10-8). Otherwise, the data $D(X,Y)$ is set to be "00"$_{hex}$ (the minimum level 0) (step 10-9).

If the number Y is 3 or 4, this corresponds to the white level portion. All the data $(X,Y)$ are set to be "FF" (steps 10-10 and 10-11).

If Y is 5, then it represents the data portion. The transmission data $D(X,Y)$ corresponding to the horizontal address X is determined according to the transmission mode (steps 10-12 and 10-13 and the description made with reference to FIG. 2).

If Y is 6, then it represents the blank portion. All the data $D(X,Y)$ are set to be "00" (steps 10-14 and 10-15).

The memory controller 223 is operated to output the data $D(X,Y)$ at addresses $(X,Y)$ to the D/A converter 226 (step 10-20). When the data is output, the X address is incremented by one (step 10-21). If Y is 7 or more, it corresponds to the image portion. The control circuit discriminates the number Y of vertical lines on the basis of the variable j representing the present color order by the transmission mode number and determines image signal data $D(X,Y)$ to be output.

The following flow is executed to select the transmission field in the field mode according to the state of the switch 43 prior to the decision block in step 10-16.

When the switch 43 is set for the second field, the control circuit 100 determines in step 10-60 whether Y is an even number so that the data to be transmitted comprise signals written entirely in the even-numbered lines in the lines Y of the memory. If NO in step 10-60, the value Y is incremented by one. The control circuit 100 commands in step 10-61 that even-numbered lines are selected in step 10-27. If the first field is selected in step 10-59, the flow is initiated when Y=7 (odd number). In consideration of step 10-27, the operation in step 10-61 for the even-numbered lines in the lines Y is not performed, and the flow advances to the next step.

If the transmission mode number is "1" or "2" in step 10-16, i.e., if the two- or three-color mode is set, the frame memory used for data readout is determined as follows:

| (TX Mode No., | j, | Vertical Line Y) | Selected Memory |
|---|---|---|---|
| (1, | 0, | all lines) | G |
| (1, | 1, | odd-numbered lines) | R |
| (1, | 1, | even-numbered lines) | B |
| (2, | 0, | all lines) | R |
| (2, | 1, | all lines) | G |
| (2, | 2, | all lines) | B |

In step 10-17, the transmission data D(X,Y) is read out from each color frame memory.

If the control circuit 100 determines in step 10-16 that the transmission mode number is "3", i.e., the four-color mode, the transmission data is subjected to undercolor removal and is converted into R, G, and B data and black data Bk, thereby generating the data by the following calculations (step 10-19):

If j=0, then D(X,Y)=R(X,Y)−Bk(X,Y)

If j=1, then D(X,Y)=G(X,Y)−Bk(X,Y)

If j=2, then D(X,Y)=B(X,Y)=Bk(X,Y)

If j=3, then D(X,Y)=Bk(X,Y)

for Bk(X,Y)=k×min(R(X,Y), G(X,Y),B(X,Y)) where k is a predetermined coefficient and min represents a minimun one of R(X,Y), G(X,Y), and B(X,Y).

The control circuit 100 determines in step 10-16 that the transmission mode number is "0", i.e., the monochromatic or single color mode. If the single color transmission mode flag MCLFLG is not set in step 5-27 in FIG. 5 and the single color transmission mode is not set, the transmission data comprises only the luminance signal Y. In order to obtain such data, the following calculation is performed using the data read out from the frame memories in step 10-18:

$$D(X,Y)=0.59\times G(X,Y)+0.30\times R(X,Y)+0.11\times B(X,Y)$$

where R(X,Y), G(X,Y) and B(X,Y) are respectively data at addresses (X,Y) of the memories 213 to 215. If the flag MCLFLG is set, the image signal data D(X,Y) is determined on the basis of the switch code set in step 5-28, the corresponding transmission mode, and the vertical line Y as follows:

| TX Mode No. Prior to Setting of Switch Code in Step 5-28 | Switch Code | Vertical Line Y | Data D(X,Y) |
|---|---|---|---|
| 1 | 10 | All lines | G(X,Y) |
| 1 | 01 | Odd-numbered lines | R(X,Y) |
| 1 | 01 | Even-numbered lines | B(X,Y) |
| 2 | 00 | All lines | R(X,Y) |
| 2 | 01 | All lines | G(X,Y) |
| 2 | 10 | All lines | B(X,Y) |
| 3 | 00 | All lines | R(X,Y)-Bk(X,Y) |
| 3 | 01 | All lines | G(X,Y)-Bk(X,Y) |
| 3 | 10 | All lines | B(X,Y)-Bk(X,Y) |
| 3 | 11 | All lines | Bk(X,Y) |

Wherein Bk(X,Y)=k×min(R(X,Y), G(X,Y), B(X,Y) (k is the predetermined coefficient and min represents a minimum one of R(X,Y), G(X,Y) and B(X,Y)).

The data D(X,Y) is set as described above. If X=0 in steps 10-55 and 10-56, the data D(X,Y) is updated to "FF", i.e., the white peak level in the image period, i.e., Y>6. If a wide black portion is present in the image, the non-signal state continues for lines corresponding to the black portion. This may be erroneously detected as the end of transmission by the receiving side. Therefore, by generating at least one white signal for every line, the above operation failure can be prevented.

The data D(X,Y) at the address (X,Y) is output to the D/A converter 226 (step 10-20). When the data is output, the X address is incremented by one (step 10-21). If the incremented X address exceeds the end address XE, X is reset (steps 10-22 and 10-23). When the horizontal address X is reset, the vertical line number Y is incremented. If Y is 6 or less, i.e., if the nonimage portion such as the synchronism portion is detected, the value Y is incremented by only one in step 10-26. If Y is 6 or more, i.e., if the image portion is detected, the control circuit 100 determines in step 10-25 whether the transmission mode is the frame mode. If YES in step 10-25, all vertical lines are transmitted. In this case, Y is incremented by only one in step 10-26. However, if the field mode is detected, the image signals of every other vertical line are transmitted. In this case, Y is incremented by 2 in step 10-27.

When the Y value is incremented as described above, the control circuit 100 determines in step 10-28 whether the incremented value exceeds the final line YE. If YES in step 10-28, transmission of the first color has been completed, and thus j is incremented by one (step 10-29). As a result, if the variable j is smaller than the transmission number (step 10-30), Y is reset to 0 to continue transmission of the next color signal (step 10-31) (so-called "plane-sequential transmission" of the signals). However, if the variable j is not smaller than the transmission mode signal, the control circuit 100 determines in step 10-54 whether the flag ATX-FLG is set at logic "1". If YES in step 10-54, i is incremented (step 10-54).

Then, the flag TXFLG is reset (step 10-32), the flag MLF is reset to cancel memory locking (step 10-33), and the flag IRQMSK is set to inhibit the interrupt operation (step 10-34).

Interrupt processing will be described if RXFLG=1, i.e., the receiving mode is set.

As described with reference to FIGS. 9A, 9B, 9C and 9D, in the reciving mode, the operations in steps 9-2 to 9-7 are executed. After the blank portion shown in FIG. 2 is detected, the address (X,Y) of the memory is initialized to be (0,7) in step 9-9. The flag RXFLG is set (step 9-10) and the interrupt mask flag IRQMSK is reset (step 9-12).

Interrupt processing can be performed in this state in the receiving mode. More specifically, since the flag RXFLG is set at logic "1", the flow in step 10-5 is branched to step 10-38. The data is fetched from the A/D converter 224 in step 10-38, and the data is written in the memory (step 10-39) designated by (transmission mode number, j,y). In the initial operation state, Y=7.

The control cirucit 100 checks bit 3 of the received transmission data to be "0" or "1", i.e., checks whether the normal color transmission mode (monochromatic, two-color, three-color, or four-color) or the single color transmission mode (R, G, B, or Bk) is set. By this decision (step 10-59), the flow is branched into step 10-39 or 10-60. The frame memory is selected to store data therein according to the transmission mode number, the variable j, and Y as follows:

| (TX mode No., | j, | Vertical Line) | Selected Memory |
|---|---|---|---|
| (0(mono.), | 0, | all lines) | G |
| (1(2-color) | 0, | all lines) | G |
| (1, | 1, | odd-numbered lines) | R |
| (1, | 1, | even-numbered lines) | B |
| (2(3-color), | 0, | all lines) | R |
| (2, | 1, | all lines) | G |
| (2, | 2, | all lines) | B |
| (3(4-color), | 0, | all lines) | R |
| (3, | 1, | all lines) | G |
| (3, | 2, | all lines) | B |
| (3, | 3, | all lines) | Bk |

If bit 3 is set at logic "1", i.e., if the single color tarnsmission mode is set, the received data D(X,Y) is written in the frame memory on the basis of the transmission mode number, the switch code, and the vertical line Y in the transmission data (step 10-60).

The correspondence between the memories and the data is summarized as follows:

| Bit1, Bit2 of Data Portion | Bit3, Bit4 of Data Portion (Switch Code SC) | Vertical Line | Storage Memory |
|---|---|---|---|
| 01 | 00 | all lines | G |
| 01 | 01 | odd-numbered lines | R |
| 01 | 01 | even-numbered lines | B |
| 10 | 00 | all lines | R |
| 10 | 01 | all lines | G |
| 10 | 10 | all lines | B |
| 11 | 00 | all lines | R |
| 11 | 01 | all lines | G |
| 11 | 10 | all lines | B |
| 11 | 11 | all lines | BK |

The memory is selected to receive the data as described above. When one data is stored in such a memory, the address X is incremented (step 10-40). When the incremented address X exceeds the end address XE (step 10-41), the address X is reset to be zero (step 10-42). The address Y is incremented in the same manner as in steps 10-24 to 10-27 (steps 10-43 to 10-46). If the incremented address Y exceeds the end address YE (step 10-47), j is incremented by one to transmit the next color signal (step 10-48). If the updated j is smaller than the transmission mode number (step 10-49), the value Y is reset to zero (step 10-50). However, if the j value exceeds the transmission number, the present reception cycle has been completed. In this case, the flag MLF is reset to cancel memory locking (step 10-51) and the flag IRQMSK is reset to inhibit the interrupt operation (step 10-52).

In the two-color mode, the R and B signals are line-sequentially stored in the R and B memories 213 and 215. When the received signals are to be recorded in the magnetic sheet 201, simple access of the memories 214 and 215 does not allow the color difference matrix circuit 219 to encode the luminance signal. Therefore, interpolation must be performed using the adjacent lines without data in accordance with the line sequential scheme. This operation is simultaneously performed with reception under the control of the memory controller 223.

In the above embodiment, analog transmission is exemplified. However, the present invention is applicable to digital transmission.

In the above embodiment, only one jacket is used. However, the present invention is not limited to this arrangement. If an auto charger capable of arbitrarily changing a plurality of jackets is used, the number of jackets subjected to auto RX auto recording can be increased.

In the above embodiment, the field or frame freezing mode is set according to the field or frame represented by the reproduced ID signal. However, a selection switch may be arranged to free a frame mode image in the field mode.

In the above embodiment, the system has a single field head. However, the same effect as described above can be obtained in a system having an in-line frame head.

In the above embodiment, the magnetic recording medium is used as the recording medium. However, other recording media such as an erasable optical recording medium may be used.

In the embodiment described above, the display means for displaying the kinds of color signals during transmission comprises LEDs L1 to L4 and L9 to L12, and the kinds of color signals are represented by combinations of these LEDs. However, any special display means for each color signal may be arranged. For example, the kinds of the color signal may be displayed in characters by using a liquid crystal display device.

In the above embodiment, the display of the color signals during transmission as well as the display of the color signals to be supplied to the monitor display in the monitor mode are performed using the LEDs L1 to L4. In order to achieve such a multifunctional operation, a display means such as a liquid crystal display device may be used to display characters.

In the above embodiment, as described in the columns of the format of the transmission data, a signal (i.e., bit 0 of the first byte) for discriminating the field transmission mode from the frame transmission mode is transmitted. At the receiving side, addressing for writing the image signals in the memories in steps 10-44 to 10-46 is controlled according to the determined transmission mode. Moreover, one- or two-track recording on the magnetic sheet is automatically controlled according to the field or frame transmission mode.

In the above embodiment, the data portion, the content of which is described in the column of the format of the transmission data, is externally transmitted together with the still image information.

In order to send the ID data, the content of the ID data may be converted into a character pattern and may be superposed on the image. According to this method, the superposed image signal is degraded. However, according to the embodiment described above, the ID data and the image signal are time-divisionally transmitted to prevent such degradation, In addition, the ID data is transmitted prior to the image signal. An effective operation is assured on the receiving side. For example, the received image signal can be recorded at a position corresponding to the track number represented by the ID data.

In the above embodiment, reproduction, storage, and readout of the data with respect to the tracks in the magnetic sheet are performed in an order of track numbers set in the track number setting routine shown in FIGS. 8A, 8B, and 8C. However, the image signals may be automatically and sequentially reproduced from, recorded in, or read out from, e.g., the first track in the inner direction of the magnetic disk without presetting the track numbers.

In the above embodiment, steps 6-14 and 6-20 correspond to a means for discriminating the field image signal from the frame image signal, and steps 6-18 and 6-21 correspond to a means for controlling the storage states of the memories 213 to 215 and 250.

In the above embodiment, when frame freezing is performed using the single head, the head is shifted between the adjacent tracks. If an in-line head is used, such an operation need not be performed so as to achieve frame freezing.

In the above embodiment, an apparatus is exemplified in which the image signal recorded in the magnetic sheet is frozen in memories. However, the method described with reference to the above embodiment is applicable to an apparatus which does not have the reproduction function but only the storage function.

The following effects can be obtained according to the embodiment described above.

(1) Since the kind of a color signal during transmission can be indicated, appropriate procedures can be performed even if a transmission failure occurs. In addition, display of the color signal during transmission as well as display of the color signal supplied to the monitor display can be performed by identical LEDs, thus effectively performing such a display.

(2) The operations in the transmission and reception sides are automatically performed according to the field or frame transmission mode or the like, and thus, manual operations need not be performed.

(3) The still image signal recorded in the recording medium and the data signal recorded together therewith can be externally transmitted, and thus the data signal can be effectively utilized.

(4) An automatic reproduction/transmission function is provided to temporarily store the still image signal reproduced from the recording medium in the memories and reproducing the next image signal upon transmission of the previous image signal. The above operation is repeated to greatly improve operability of transmission of a plurality of still images. Moreover, the storage operation of the memory means can be appropriately controlled according to the kinds of input image signals. Field or frame freezing of the frame memories as the storage means can be automatically controlled according to the field or frame image signal, thereby preventing storage errors of the memory means and hence assuring good storage operations.

We claim:

1. An image processing apparatus comprising:
   a) reproducing means for reproducing an iamge signal from a medium for recording said image signal therein, said reproducing changing an access position with respect to said medium;
   b) storage means for storing at least a one-field image signal reproduced by said reproducing means whenever said access position of said reproducing means is changed; and
   c) designating means for designating an inhibition of storage of said storage means when said access position of said reproducing means is changed.

2. An apparatus of claim 1, further comprising:
   d) supplying means for selectively supplying to a monitor said image signal stored in said storage means and an image signal reproduced by said reproducing means without going through said storage means.

3. An apparatus of claim 1, wherein said designating means includes a manual operation member for designating a command.

4. An apparatus of claim 2, further comprising:
   e) control means for supplying said image signal stored in said storage means to said monitor in accordance with a storage operation of said storage means.

5. An apparatus of claim 1, wherein said reproducing means includes:

a) a reproduction head for changing an access position with respect to said medium; and
   b) process means for processing the signal reproduced by said reproducing head.

6. An apparatus of claim 1, wherein said storage means includes:
   a) means for discriminating a change in said access position of said reproducing means;
   b) a memory for storing at least a one-field image signal reproduced by said reproducing means; and
   c) means for causing said memory to store said image signal reproduced by said reproducing means when said access position of said reproducing means is changed.

7. An image transmission apparatus comprising:
   a) reproducing means for reproducing image information from a medium for storing a plurality of pieces of image information;
   b) storage means for storing at least a one-picture image information reproduced by said reproducing means;
   c) transmitting means for reading out said image signal stored in said storage means and transmitting a readout image signal;
   d) means for indicating a transmitting operation of said transmitting means; and
   e) control means for operating said reproducing means, said storage means, said indicating means, and said transmitting means a plurality of times in order.

8. An apparatus of claim 7, wherein said reproducing means can change a reproducing position with respect to said medium.

9. An apparatus of claim 8, wherein said control means comprises means for changing said reproducing position of said reproducing means every time said reproducing means is operated.

10. An apparatus of claim 9, further comprising change order storage means for storing a change order of said reproducing position of said reproducing means, said change order being controlled by said control means.

11. An apparatus of claim 10, further comprising designating means for designating said change order stored in said change order storage means.

12. A method of controlling image transmission comprising the steps of:
   (a) reproducing, with a reproducing means, image information from a medium for storing a plurality of pieces of image information;
   (b) storing, with a storage means, at least a one-picture image information reproduced by the reproducing means;
   (c) reading out, with transmitting means, the image signals stored in the storage means and transmitting a readout image signal;
   (d) indicating, with an indicating means, a transmitting operation of said transmitting means; and
   (e) operating, with a control means, the reproducing means, the storage means, the indicating means, and the transmitting means a plurality of times in order.

13. A method according to claim 12, further comprising the step of changing, with the reproducing means, a reproducing position with respect to said medium.

14. A method according to claim 13, wherein said changing step includes the step of changing said reproducing position of said reproducing means every time said reproducing means is operated.

15. A method according to claim 14, further comprising the step of storing, with a change order storage means, a change order of said reproducing position of said reproducing means, the change order being controlled by the control means.

16. A method according to claim 15, further comprising the step of designating, with a designating means, the change order stored in the change order storage means.

* * * * *

UNITED STATES PATENT AND TRADEMARK OFFICE
CERTIFICATE OF CORRECTION

PATENT NO. : 5,523,860
DATED : June 4, 1996
INVENTOR(S) : MASAHIRO TAKEI, ET AL.

Page 1 of 2

Figure 9B:
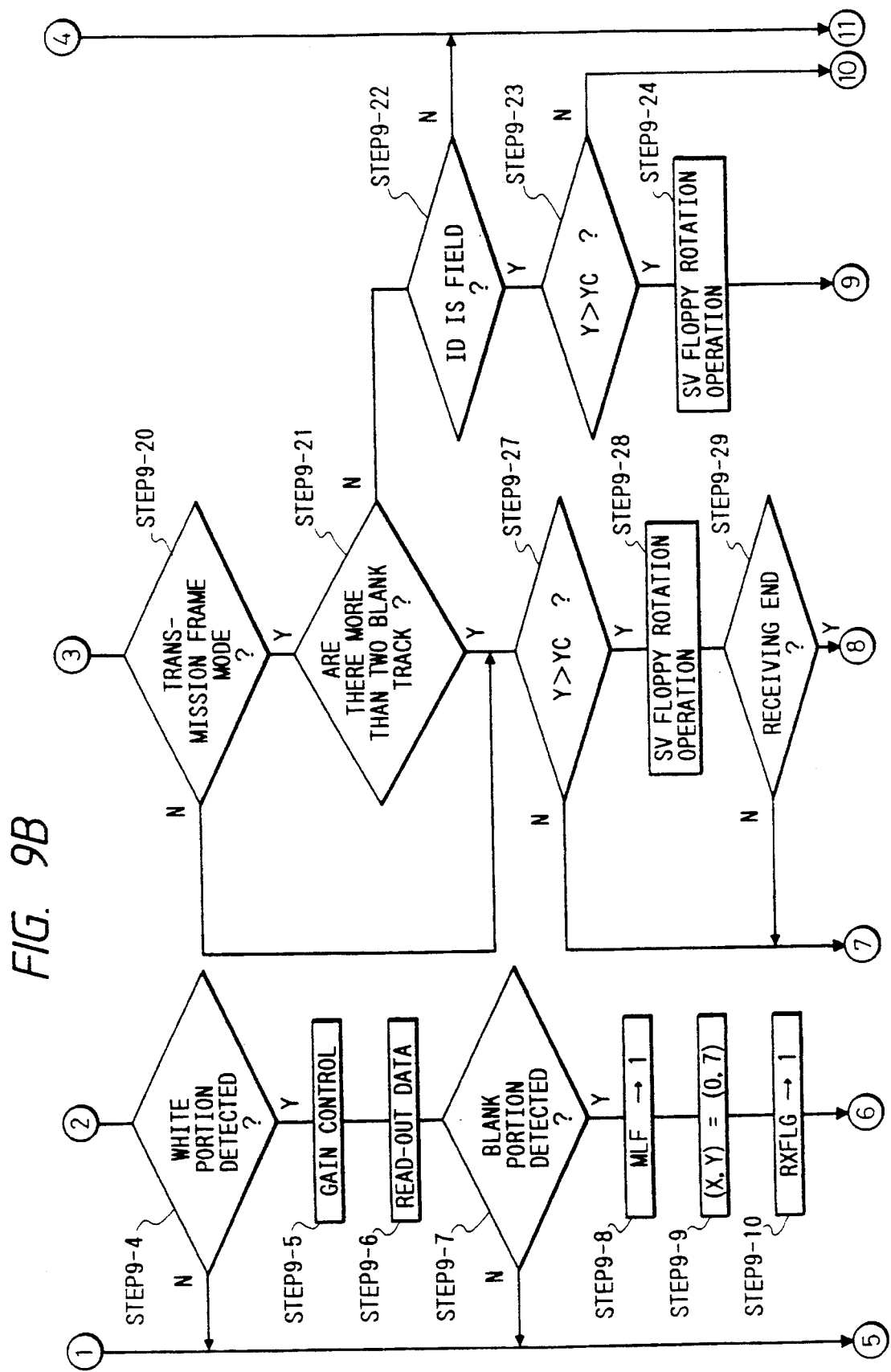
Figure 9C:
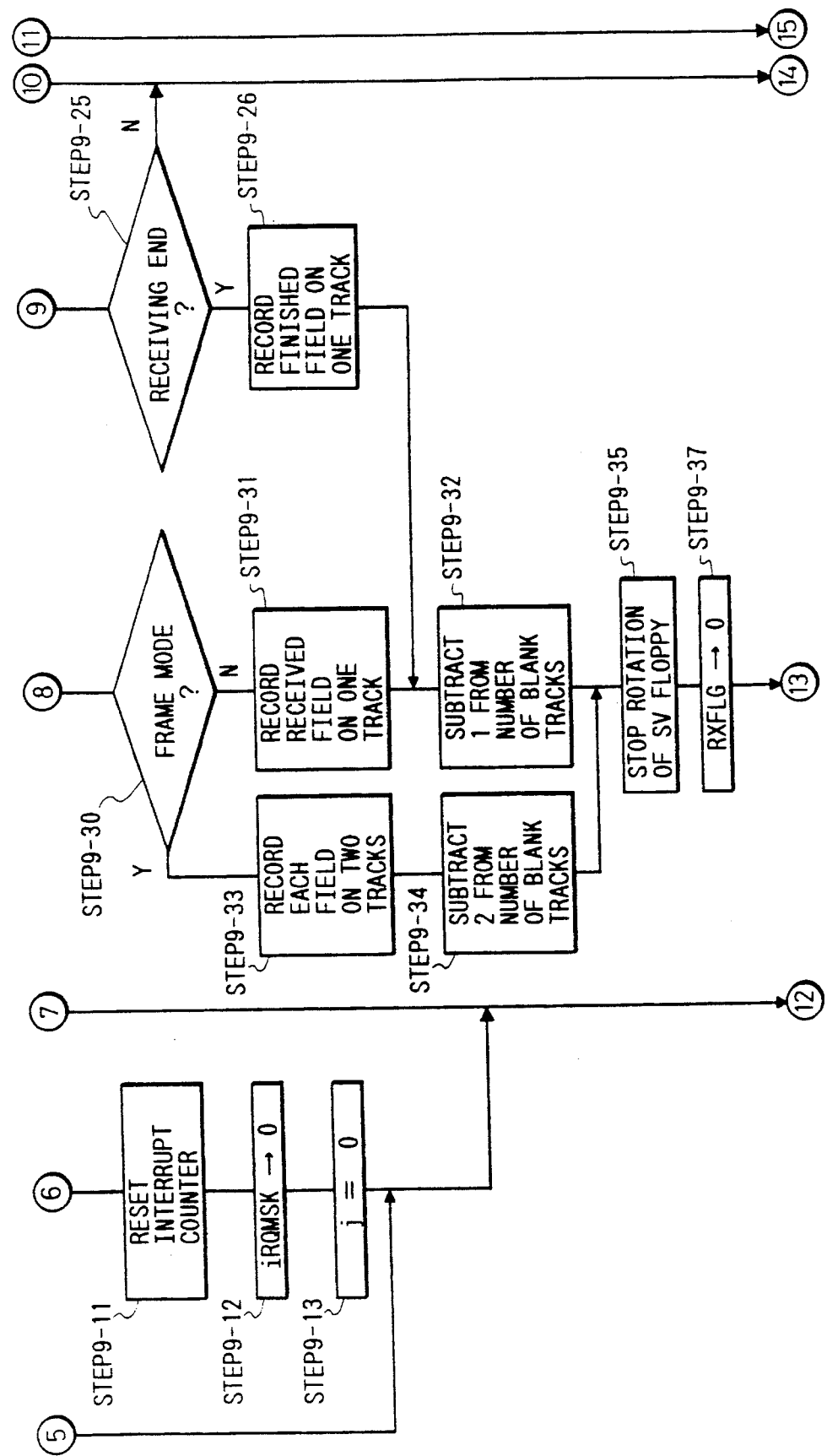
Figure 9D:
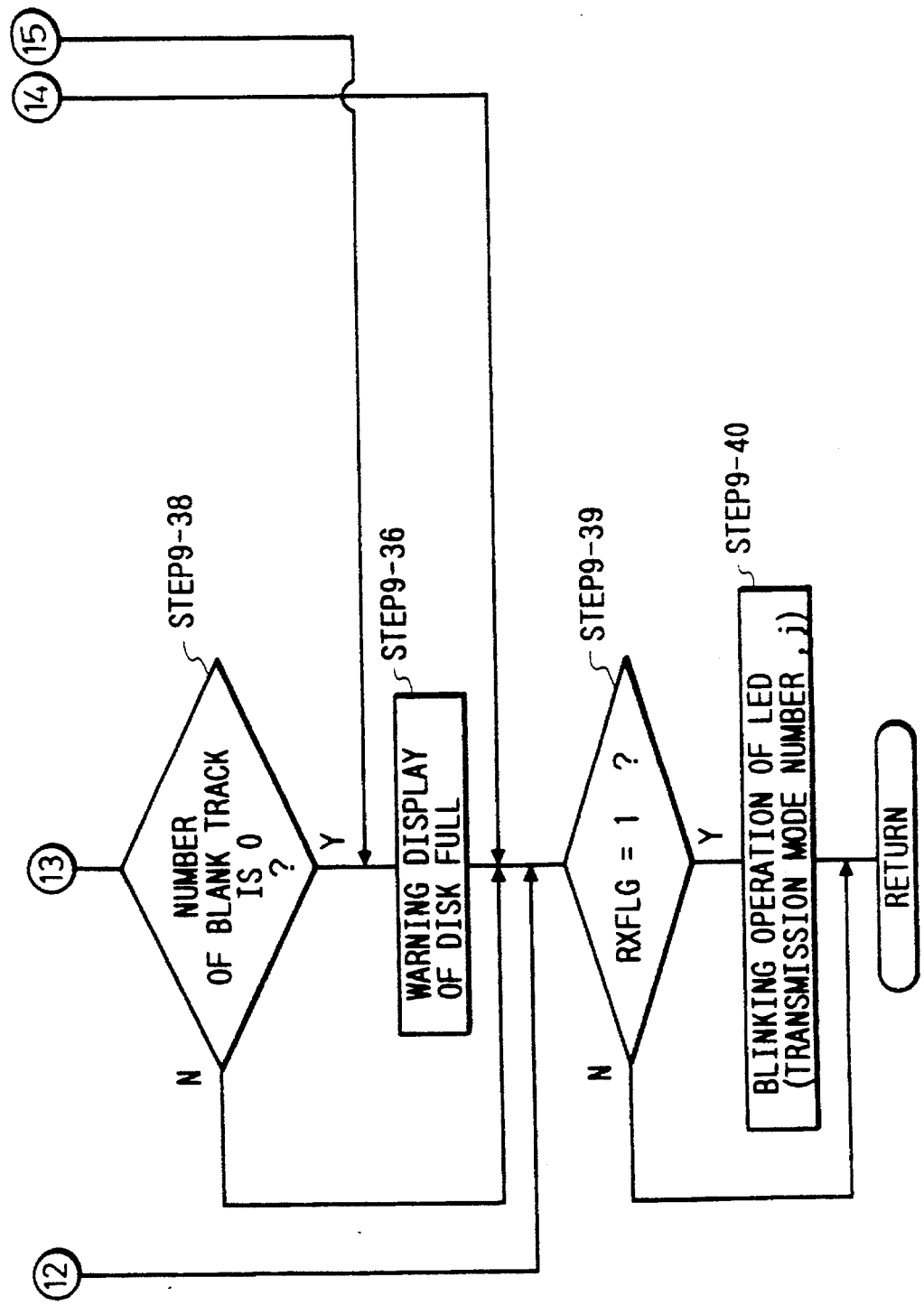
Figures 3, 10A:
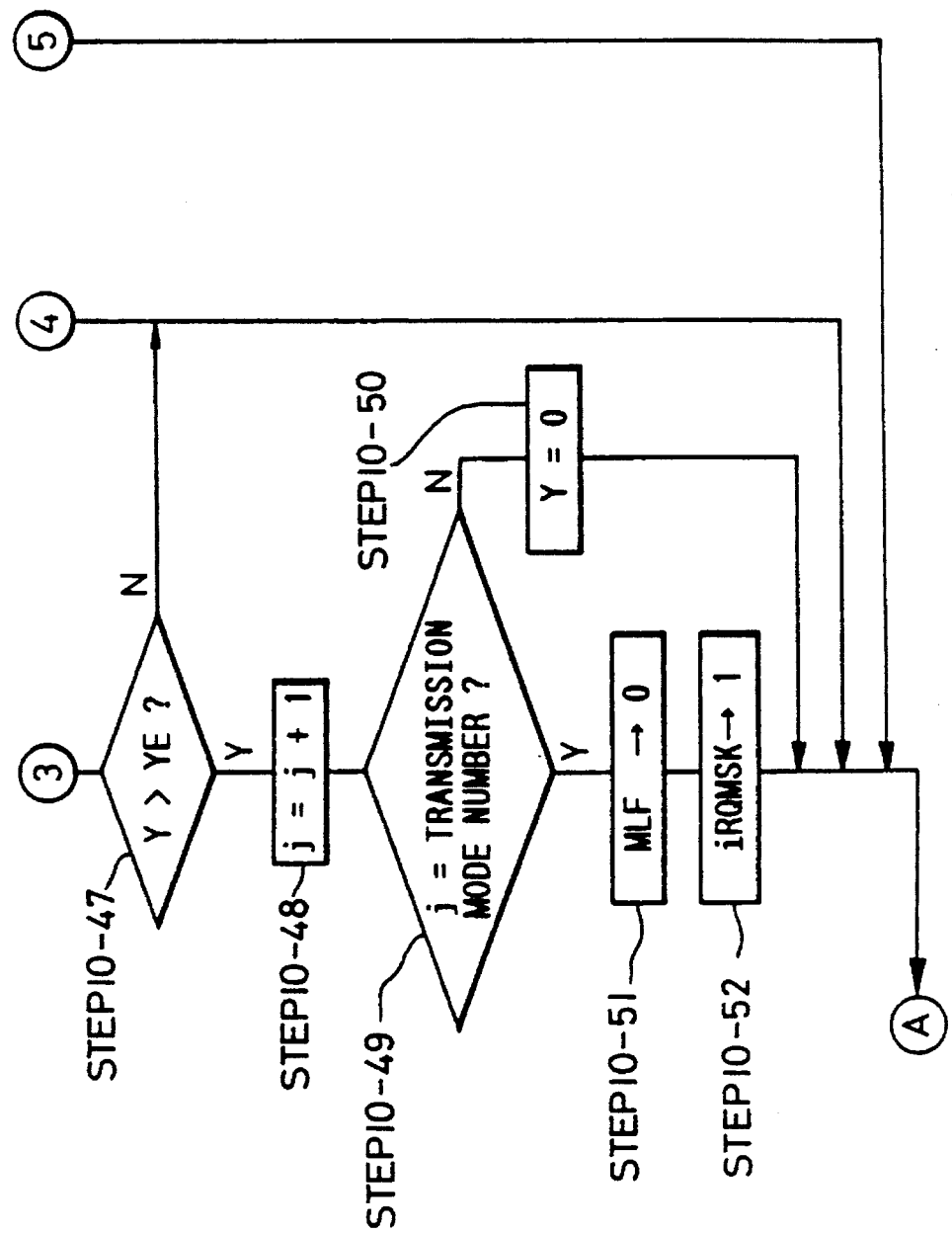
Figures 2, 10B:
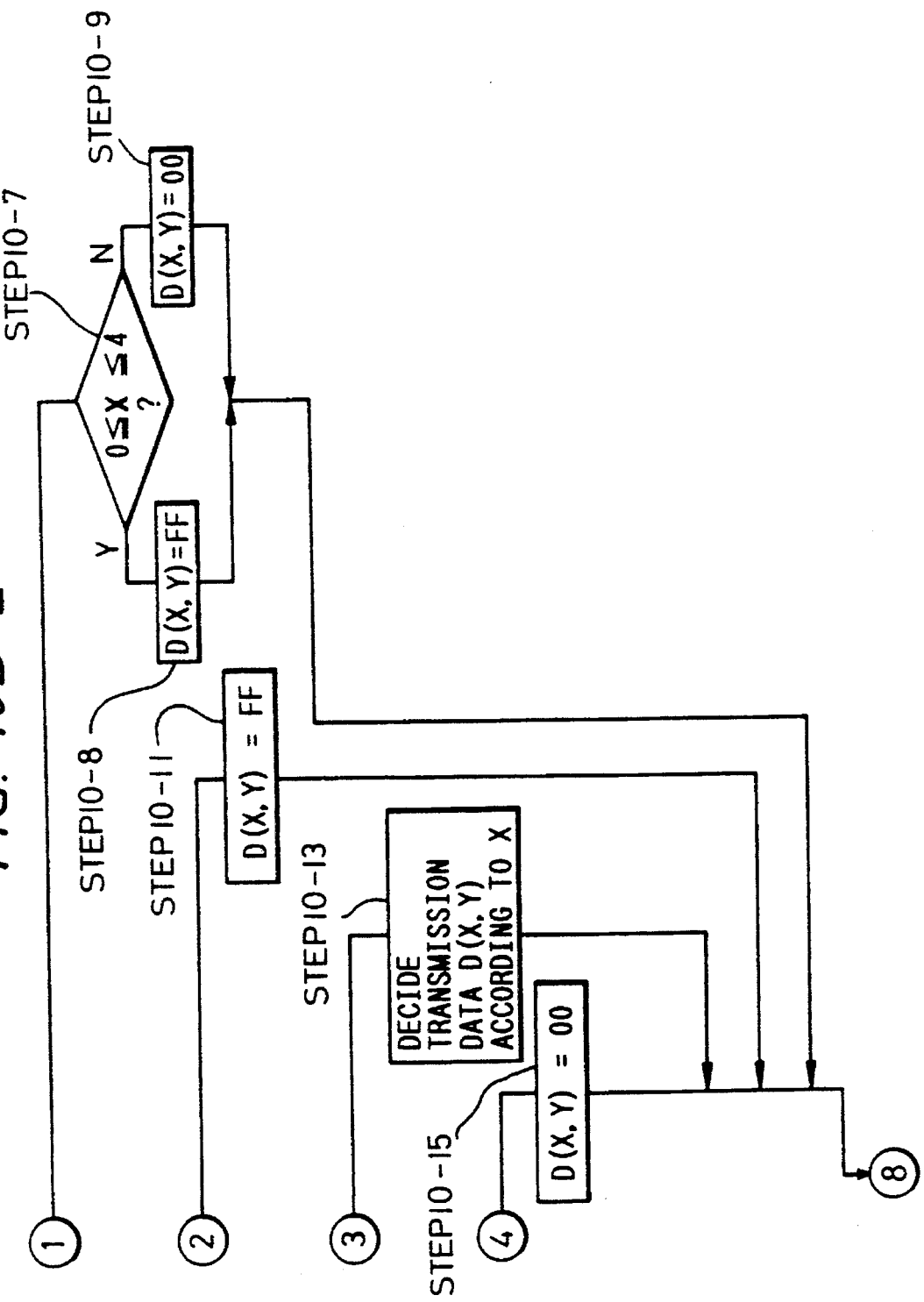
Figures 3, 10B:
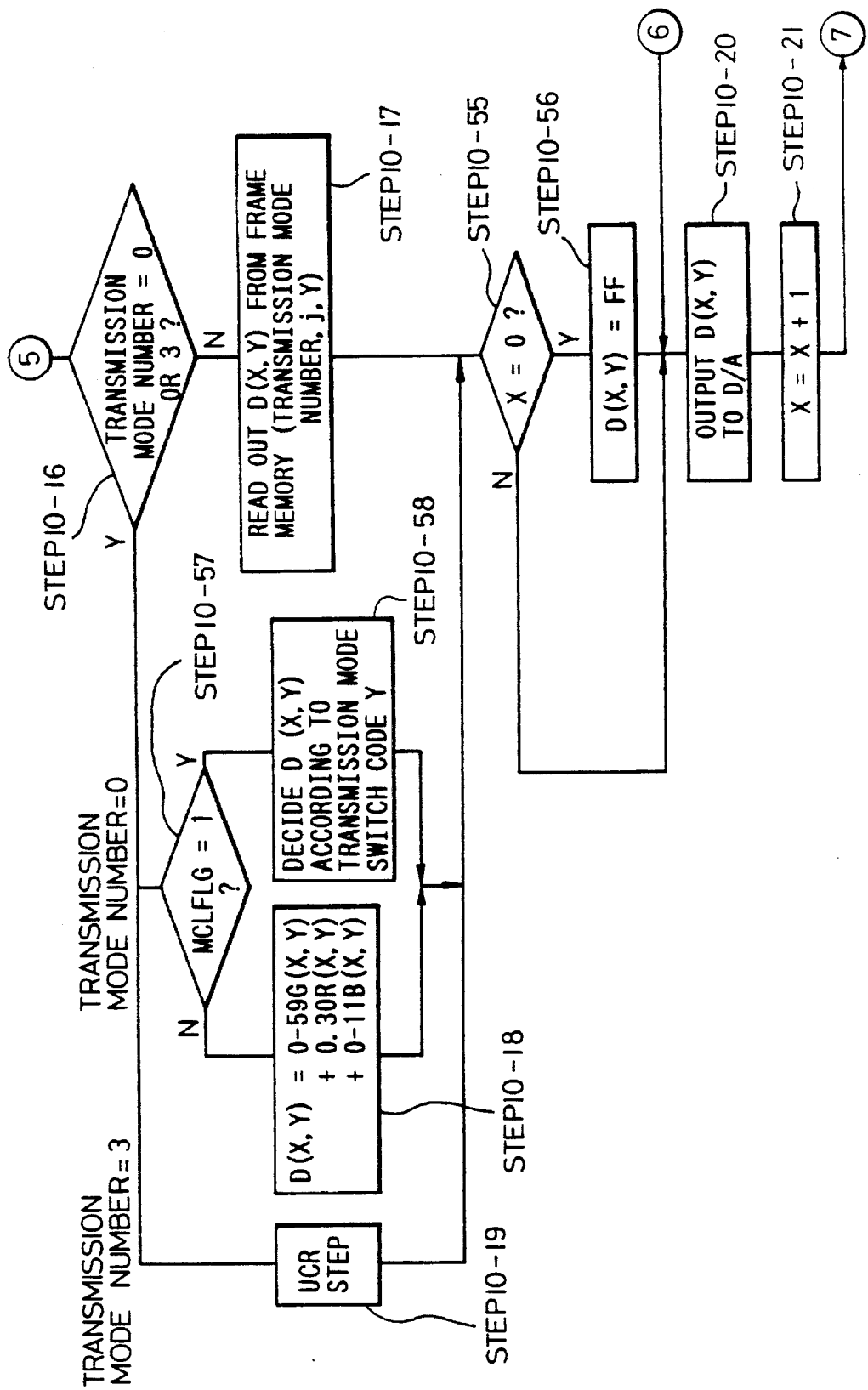
Figures 4, 10B:
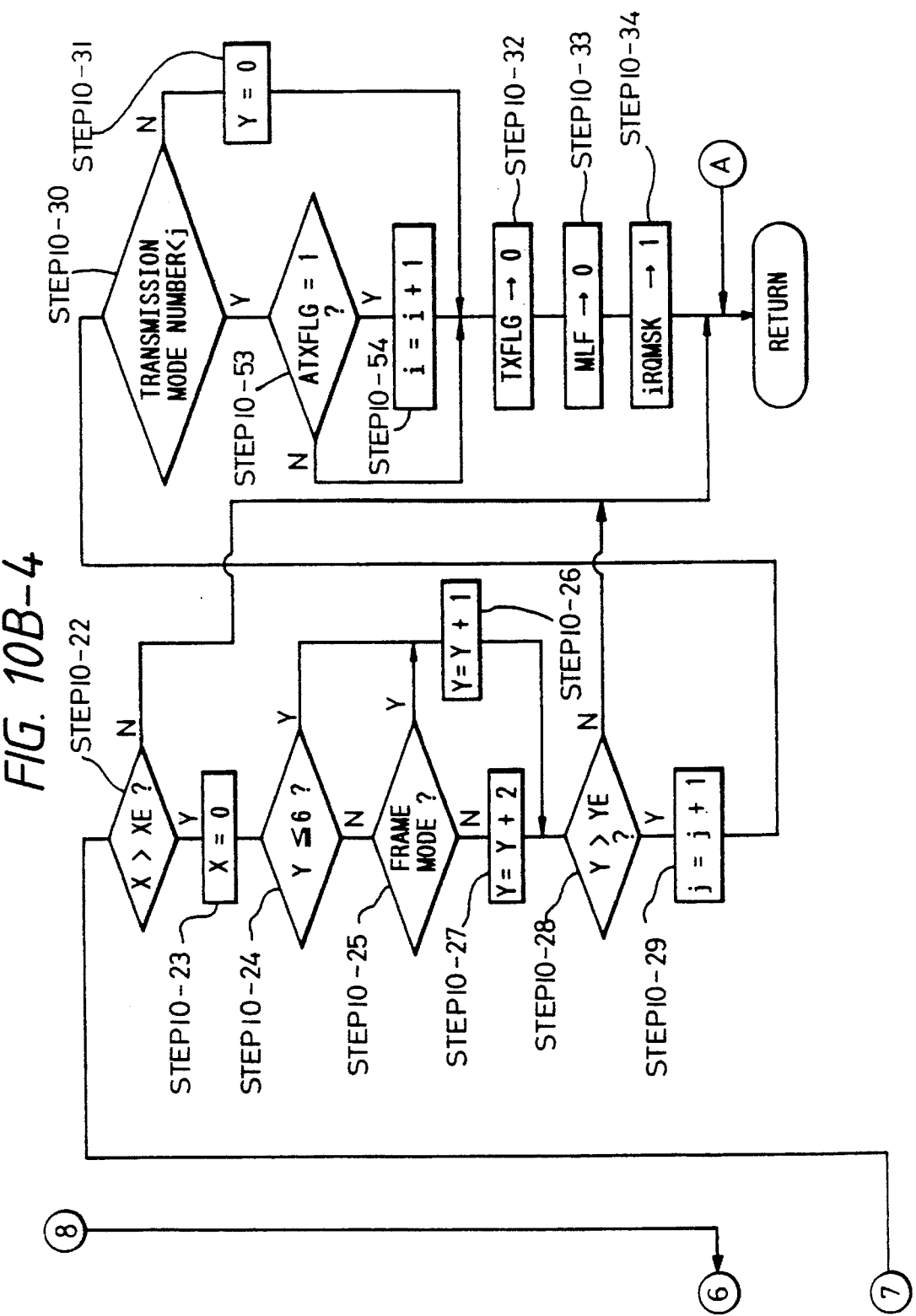

It is certified that error appears in the above-indentified patent and that said Letters Patent is hereby corrected as shown below:

Title page, item [75],
"unio Tsuruno," should read --Kunio Tsuruno,--.
Title page, item [57],
    line 8, "R G" should read --R, G--.
Figure 9B,
    "TRACK?" should read --TRACKS?--.
Column 3,
    line 55, "10A-1;" should read --10A-1,--.
Column 6,
    line 33, "block" should read --a block--.
Column 8,
    line 42, "dislay" should read --display--.
Column 10,
    line 23, "single, color," should read --single color,--.
Column 11,
    line 61, "in" should read --in the--.
Column 12,
    line 58, "be located" should be deleted, and "locate" should read --be located--.
Column 13,
    line 1, "to in" should read --in--.
Column 14,
    line 31, "and" should be deleted.
Column 17,
    line 6, "comprise" should read --which comprises--.

UNITED STATES PATENT AND TRADEMARK OFFICE
CERTIFICATE OF CORRECTION

PATENT NO. : 5,523,860
DATED : June 4, 1996
INVENTOR(S) : MASAHIRO TAKEI, ET AL.

It is certified that error appears in the above-indentified patent and that said Letters Patent is hereby corrected as shown below:

Column 19,
    line 64, "contorl" should read --control--.
Column 20,
    line 64, "read" should read --are read--.
Column 22,
    line 11, "10-3," should read --10A-3,--.
Column 23,
    line 27, "minimun" should read --minimum--.
Column 24,
    line 32, ""plane-sequential" should read --plane [field or frame]-sequential--.
Column 25,
    line 15, "tarnsmission" should read --transmission--.
Column 27,
    line 42, "iamge" should read --image--; and
    line 44, "reproducing" should read --reproducing means--.

Signed and Sealed this

Twenty-sixth Day of November 1996

Attest:

BRUCE LEHMAN

Attesting Officer      Commissioner of Patents and Trademarks